(12) United States Patent
Rieger et al.

(10) Patent No.: US 8,474,340 B2
(45) Date of Patent: *Jul. 2, 2013

(54) DOUBLE CLUTCH TRANSMISSION

(75) Inventors: Wolfgang Rieger, Friedrichshafen (DE); Matthias Reisch, Ravensburg (DE); Juergen Wafzig, Eriskirch (DE); Gerhard Gumpoltsberger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 536 days.

This patent is subject to a terminal disclaimer.

(21) Appl. No.: 12/759,001

(22) Filed: Apr. 13, 2010

(65) Prior Publication Data

US 2010/0257960 A1    Oct. 14, 2010

(30) Foreign Application Priority Data

Apr. 14, 2009 (DE) .......................... 10 2009 002 358

(51) Int. Cl.
*F16H 3/093* (2006.01)

(52) U.S. Cl.
USPC .............................................. 74/330; 74/331

(58) Field of Classification Search
USPC .................................... 74/330, 331
See application file for complete search history.

(56) References Cited

U.S. PATENT DOCUMENTS

| | | | | |
|---|---|---|---|---|
| 2,543,412 | A * | 2/1951 | Kegresse | 74/330 |
| 7,437,963 | B2 * | 10/2008 | Haka et al. | 74/329 |
| 2005/0000307 | A1 | 1/2005 | Gumpoltsberger | |
| 2008/0245166 | A1 * | 10/2008 | Baldwin | 74/331 |

FOREIGN PATENT DOCUMENTS

| | | |
|---|---|---|
| DE | 38 22 330 A1 | 7/1989 |
| DE | 100 15 336 A1 | 10/2001 |
| DE | 103 05 241 A1 | 9/2004 |
| DE | 10 2004 001 961 A1 | 8/2005 |
| DE | 10 2005 028 532 A1 | 12/2006 |
| DE | 10 2007 049 257 A1 | 4/2009 |
| DE | 10 2007 049 259 A1 | 4/2009 |
| DE | 10 2007 049 260 A1 | 4/2009 |
| DE | 10 2007 049 263 A1 | 4/2009 |
| DE | 10 2007 049 264 A1 | 4/2009 |
| DE | 10 2007 049 265 A1 | 4/2009 |
| DE | 10 2007 049 266 A1 | 4/2009 |
| DE | 10 2007 049 267 A1 | 4/2009 |
| DE | 10 2007 049 269 A1 | 4/2009 |
| DE | 10 2007 049 270 A1 | 4/2009 |

* cited by examiner

*Primary Examiner* — William C Joyce
(74) *Attorney, Agent, or Firm* — Davis & Bujold, PLLC

(57) ABSTRACT

A double clutch transmission with first and second clutches (K1, K2) with input sides connected with an input shaft (w_an) and output sides respectively connected with one of two coaxially arranged transmission output shafts (w_k1, w_k2). At least first and second countershafts (w_v1, w_v2) are provided on which are mounted idler gearwheels (8, 9, 10, 11, 12, 13, 14, 15), while on the two first and the second transmission input shafts (w_k1, w_k2) are mounted fixed gearwheels (1, 2, 3, 4, 5) whereby at least several power shiftable forward gears (1, 2, 3, 4, 5, 6, 7, 8) and at least one reverse gear (R1, R2, R3, R4) is shiftable. A maximum of six gear planes (8-12, 9-13, 10-14, 11-4, 5-15) are provided so that at least one winding path gear is shifted upon disengagement of a coupling device (S_ab2) allocated to an output gear (18).

9 Claims, 14 Drawing Sheets

Fig. 2

| G | ZS | K1 | K2 | A | B | C | D | E | F | G | H | I | K | S_ab1 | S_ab2 |
|---|---|---|---|---|---|---|---|---|---|---|---|---|---|---|---|
| G1 | i_1 | 1 |   |   |   |   |   |   |   |   | 1 |   |   | 1 | 1 |
| G2 | i_2 |   | 1 |   |   |   |   |   | 1 |   |   |   |   | 1 | 1 |
| G3 | i_3 | 1 |   |   |   |   |   |   |   | 1 |   |   |   | 1 | 1 |
| G4 | i_4 |   | 1 | 1 |   |   |   |   |   |   |   |   |   | 1 | 1 |
| G5 | i_5 | 1 |   |   |   |   | 1 |   |   |   |   |   |   | 1 | 1 |
| G6 | i_6 |   | 1 |   | 1 |   |   |   |   |   |   |   |   | 1 | 1 |
| G7 | i_7 | 1 |   |   |   | 1 |   |   |   |   |   |   |   | 1 | 1 |
| G8 | i_2 i_1 i_7 |   | 1 |   |   | 1 |   |   | 1 |   |   |   |   |   | 1 |

R-GEAR

| | ZS | K1 | K2 | A | B | C | D | E | F | G | H | I | K | S_ab1 | S_ab2 |
|---|---|---|---|---|---|---|---|---|---|---|---|---|---|---|---|
| R1 | i_R | 1 |   |   |   |   |   | 1 |   |   |   |   |   | 1 | 1 |
| R2 | i_3 i_2 i_R |   | 1 | 1 |   |   |   | 1 |   |   |   |   | 1 | 1 | 1 |
| R3 | i_5 i_4 i_R |   | 1 |   |   |   | 1 | 1 |   |   |   |   |   |   | 1 |
| R4 | i_5 i_6 i_R |   | 1 |   | 1 |   | 1 |   |   |   |   |   |   |   | 1 |

CRAWLER

| | ZS | K1 | K2 | A | B | C | D | E | F | G | H | I | K | S_ab1 | S_ab2 |
|---|---|---|---|---|---|---|---|---|---|---|---|---|---|---|---|
| C1 | i_6 i_7 i_1 | 1 | 1 | 1 |   |   |   |   |   |   | 1 |   |   | 1 | 1 |
| C2 | i_2 i_3 i_1 |   | 1 | 1 |   | 1 |   |   |   |   | 1 |   |   | 1 | 1 |
| C3 | i_4 i_7 i_3 |   | 1 | 1 |   | 1 | 1 |   |   |   | 1 | 1 |   |   | 1 |
| C4 | i_4 i_7 i_1 |   | 1 | 1 |   |   |   |   |   | 1 |   |   | 1 |   | 1 |
| C5 | i_4 i_5 i_1 |   | 1 | 1 |   |   | 1 |   |   |   |   |   |   |   | 1 |

Fig. 4

| G | ZS | K1 | K2 | A | B | C | D | E | F | G | H | K | S_ab1 | S_ab2 |
|---|---|---|---|---|---|---|---|---|---|---|---|---|---|---|
| G1 | i_3·i_4·i_2 | 1 |   | 1 |   |   |   | 1 |   |   | 1 |   | 1 | 1 |
| G2 | i_2 |   | 1 | 1 |   |   |   |   |   |   |   |   | 1 | 1 |
| G3 | i_3 | 1 |   |   |   |   |   |   |   |   | 1 |   | 1 | 1 |
| G4 | i_4 |   | 1 |   |   |   |   |   |   |   |   |   | 1 | 1 |
| G5 | i_5 | 1 |   |   |   |   | 1 |   |   |   |   |   | 1 | 1 |
| G6 | i_6 |   | 1 |   | 1 |   |   |   |   |   |   |   | 1 | 1 |
| G7 | i_7 | 1 |   |   |   | 1 |   |   |   |   |   |   | 1 | 1 |
| G8 | ZW_8·i_3·i_7 |   | 1 |   |   | 1 |   |   | 1 |   | 1 |   |   |   |
| R-GEAR | | | | | | | | | | | | | | |
| R1 | ZW_8·i_R·i_7 |   | 1 |   |   |   |   |   |   | 1 | 1 | 1 | 1 | 1 |
| R2 | ZW_8·i_R·i_5 |   | 1 |   |   |   |   | 1 |   | 1 |   | 1 | 1 | 1 |
| R3 | ZW_8·i_R·i_3 |   | 1 |   |   | 1 |   |   |   | 1 |   | 1 | 1 | 1 |
| R4 | i_4·i_R·i_7 |   | 1 |   |   |   | 1 |   | 1 |   | 1 |   | 1 |   |
| R5 | i_4·i_R·i_5 |   | 1 |   |   |   | 1 | 1 |   |   |   |   | 1 |   |
| R6 | ZW_8·i_R·i_7 |   | 1 |   |   |   | 1 |   |   |   |   |   | 1 |   |
| R7 | ZW_8·i_R·i_5 |   | 1 |   |   |   | 1 |   |   |   |   |   | 1 |   |
| CRAWLER | | | | | | | | | | | | | | |
| C1 | i_2·i_7·i_3 |   | 1 | 1 |   |   | 1 | 1 |   |   | 1 |   | 1 | 1 |
| C2 | i_2·i_5·i_3 |   | 1 | 1 |   |   | 1 | 1 |   |   | 1 |   | 1 | 1 |
| OVERDRIVE | | | | | | | | | | | | | | |
| O1 | i_4·i_3·i_7 |   | 1 |   |   |   |   | 1 |   |   | 1 |   |   | 1 |
| O2 | i_7·i_2·i_4 | 1 |   |   |   |   |   | 1 |   |   | 1 |   | 1 |   |

| G | ZS | K1 | K2 | A | B | C | D | E | F | G | H | K | S_ab1 | S_ab2 |
|---|---|---|---|---|---|---|---|---|---|---|---|---|---|---|
| G1 | $i_3 \cdot i_4 \cdot i_2$ | 1 |   | 1 |   |   |   |   |   |   | 1 |   | 1 | 1 |
| G2 | $i_2$ |   | 1 | 1 |   |   |   |   |   |   | 1 |   | 1 | 1 |
| G3 | $i_3$ | 1 |   |   |   |   |   |   |   |   |   |   | 1 | 1 |
| G4 | $i_4$ |   | 1 |   |   |   |   |   |   |   |   |   | 1 | 1 |
| G5 | $i_5$ |   | 1 |   |   |   | 1 |   |   |   |   |   | 1 | 1 |
| G6 | $i_6$ | 1 |   |   |   |   |   | 1 |   |   |   |   | 1 | 1 |
| G7 | $i_7$ |   | 1 |   |   | 1 |   |   |   |   |   |   | 1 | 1 |
| G8 | $i_8$ | 1 |   |   | 1 |   |   |   |   |   |   |   | 1 | 1 |

R-GEAR

| G | ZS | K1 | K2 | A | B | C | D | E | F | G | H | K | S_ab1 | S_ab2 |
|---|---|---|---|---|---|---|---|---|---|---|---|---|---|---|
| R1 | $i_6 \cdot i_R \cdot i_5$ |   | 1 | 1 |   |   | 1 |   |   |   | 1 | 1 | 1 | 1 |
| R2 | $i_6 \cdot i_R \cdot i_3$ | 1 |   | 1 |   |   | 1 |   |   |   |   | 1 | 1 | 1 |
| R3 | $i_4 \cdot i_R \cdot i_7$ |   | 1 | 1 |   |   |   | 1 |   | 1 |   |   |   |   |
| R4 | $i_4 \cdot i_R \cdot i_5$ |   | 1 | 1 |   |   |   | 1 |   | 1 |   |   |   |   |
| R5 | $i_6 \cdot i_R \cdot i_5$ | 1 |   |   |   |   |   | 1 |   | 1 |   |   |   |   |

CRAWLER

| G | ZS | K1 | K2 | A | B | C | D | E | F | G | H | K | S_ab1 | S_ab2 |
|---|---|---|---|---|---|---|---|---|---|---|---|---|---|---|
| C1 | $i_2 \cdot i_7 \cdot i_3$ |   | 1 | 1 |   | 1 |   |   | 1 |   |   |   |   | 1 |
| C2 | $i_2 \cdot i_5 \cdot i_3$ |   | 1 | 1 |   | 1 |   | 1 |   |   |   |   |   | 1 |
| C3 | $i_3 \cdot i_6 \cdot i_2$ | 1 |   |   |   | 1 |   |   |   |   | 1 |   | 1 |   |

OVERDRIVE

| G | ZS | K1 | K2 | A | B | C | D | E | F | G | H | K | S_ab1 | S_ab2 |
|---|---|---|---|---|---|---|---|---|---|---|---|---|---|---|
| O1 | $i_4 \cdot i_3 \cdot i_7$ |   | 1 | 1 |   | 1 | 1 |   | 1 |   | 1 |   | 1 | 1 |
| O2 | $i_6 \cdot i_3 \cdot i_7$ | 1 |   | 1 |   | 1 | 1 |   | 1 |   | 1 |   | 1 | 1 |
| O3 | $i_6 \cdot i_3 \cdot i_5$ | 1 |   | 1 |   | 1 | 1 |   | 1 |   |   |   |   |   |
| O4 | $i_7 \cdot i_2 \cdot i_4$ |   | 1 | 1 |   | 1 | 1 |   | 1 |   |   |   |   |   |
| O5 | $i_7 \cdot i_2 \cdot i_6$ |   | 1 | 1 |   | 1 | 1 |   | 1 |   |   |   | 1 | 1 |
| O6 | $i_5 \cdot i_2 \cdot i_6$ | 1 |   | 1 |   | 1 | 1 |   | 1 |   |   |   |   | 1 |

| G | ZS | K1 | K2 | A | B | C | D | E | G | H | I | K | S_ab1 | S_ab2 |
|---|---|---|---|---|---|---|---|---|---|---|---|---|---|---|
| G1 | i3·i4·i2 | 1 |  | 1 |  |  |  |  |  |  |  |  | 1 | 1 |
| G2 | i2 |  | 1 |  |  |  |  | 1 |  |  |  |  | 1 | 1 |
| G3 | i3 | 1 |  |  |  | 1 |  |  |  |  |  |  | 1 | 1 |
| G4 | i4 |  | 1 | 1 |  |  |  |  |  |  |  |  | 1 | 1 |
| G5 | i5 | 1 |  |  |  |  |  | 1 |  |  |  |  | 1 | 1 |
| G6 | i6 |  | 1 |  | 1 |  |  |  |  |  |  |  | 1 | 1 |
| G7 | i7 | 1 |  |  |  |  |  |  | 1 |  |  |  | 1 | 1 |
| G8 | ZW·8·i5·i7 |  | 1 |  |  |  |  |  |  | 1 |  | 1 |  |  |
| R-GEAR | | | | | | | | | | | | | | |
| R1 | i4·iR·i5 | 1 | 1 |  |  |  | 1 |  |  |  |  |  | 1 |  |
| R2 | i4·iR·i7 | 1 | 1 |  |  |  | 1 |  |  | 1 |  |  |  |  |
| R3 | i6·iR·i5 | 1 | 1 |  |  |  | 1 |  |  |  |  |  | 1 |  |
| CRAWLER | | | | | | | | | | | | | | |
| C1 | i2·i5·i3 | 1 | 1 |  |  | 1 | 1 | 1 |  |  |  |  |  | 1 |
| C2 | i2·i7·i3 | 1 |  |  |  | 1 | 1 | 1 |  | 1 |  |  |  |  |
| C3 | i3·i6·i2 |  | 1 |  | 1 |  | 1 | 1 | 1 |  |  |  |  | 1 |
| C4 | i3·i6·i2 | 1 |  |  |  |  | 1 | 1 | 1 |  | 1 |  |  | 1 |
| OVERDRIVE | | | | | | | | | | | | | | |
| O1 | i6·i3·i5 | 1 |  | 1 |  |  | 1 | 1 | 1 | 1 | 1 |  | 1 | 1 |
| O2 | i6·i3·i7 |  | 1 | 1 |  |  | 1 | 1 | 1 | 1 |  |  | 1 | 1 |
| O3 | i4·i3·i7 |  | 1 |  |  | 1 | 1 |  | 1 | 1 |  |  | 1 |  |
| O4 | i5·i2·i6 | 1 |  | 1 |  |  |  | 1 | 1 |  |  |  | 1 |  |
| O5 | i7·i2·i4 |  | 1 | 1 |  | 1 |  |  | 1 |  |  |  |  |  |
| O6 | i7·i2·i6 | 1 |  |  | 1 | 1 |  | 1 |  |  |  |  | 1 | 1 |
| O7 | i6·i3·i5 |  | 1 |  | 1 | 1 |  | 1 |  |  |  |  | 1 | 1 |
| O8 | i6·i3·i7 | 1 | 1 |  | 1 | 1 |  |  |  |  |  |  |  | 1 |

Fig. 10

| G | ZS | K1 | K2 | A | B | C | D | E | F | G | H | I | K | S_ab1 | S_ab2 |
|---|---|---|---|---|---|---|---|---|---|---|---|---|---|---|---|
| G1 | i_3 i_4 i_2 | 1 |  |  | 1 |  | 1 |  | 1 |  |  |  |  |  | 1 |
| G2 | i_2 |  | 1 |  |  |  |  |  | 1 |  |  |  |  | 1 | 1 |
| G3 | i_3 | 1 |  |  |  |  | 1 |  |  |  |  |  |  | 1 | 1 |
| G4 | i_4 |  | 1 |  | 1 |  |  |  |  |  |  |  |  | 1 | 1 |
| G5 | i_5 | 1 |  |  |  |  |  | 1 |  |  |  |  |  | 1 | 1 |
| G6 | i_6 |  | 1 |  |  |  |  |  |  | 1 |  |  |  | 1 | 1 |
| G7 | i_7 | 1 |  |  |  | 1 |  |  |  |  |  |  |  | 1 | 1 |
| G8 | i_8 |  | 1 | 1 |  |  |  |  |  |  |  |  |  | 1 | 1 |

R-GEAR

| G | ZS | K1 | K2 | A | B | C | D | E | F | G | H | I | K | S_ab1 | S_ab2 |
|---|---|---|---|---|---|---|---|---|---|---|---|---|---|---|---|
| R1 | i_4 i_7 iR |  | 1 |  |  |  |  |  |  |  | 1 | 1 |  |  | 1 |
| R2 | i_2 i_5 iR | 1 |  |  |  |  |  |  |  |  |  | 1 | 1 |  | 1 |
| R3 | iR i_6 i_4 | 1 |  |  |  |  |  |  |  |  | 1 |  | 1 |  | 1 |
| R4 | i_4 i_7 iR |  | 1 |  |  |  |  |  |  |  |  |  |  |  | 1 |

CRAWLER

| G | ZS | K1 | K2 | A | B | C | D | E | F | G | H | I | K | S_ab1 | S_ab2 |
|---|---|---|---|---|---|---|---|---|---|---|---|---|---|---|---|
| C1 | i_4 i_7 i_3 | 1 |  |  | 1 |  |  |  |  |  |  | 1 |  |  | 1 |
| C2 | i_2 i_5 i_3 |  | 1 |  |  | 1 |  |  |  |  |  | 1 |  |  | 1 |
| C3 | i_3 i_8 i_2 | 1 |  | 1 |  |  | 1 |  |  |  |  |  |  |  | 1 |

OVERDRIVE

| G | ZS | K1 | K2 | A | B | C | D | E | F | G | H | I | K | S_ab1 | S_ab2 |
|---|---|---|---|---|---|---|---|---|---|---|---|---|---|---|---|
| O1 | i_8 i_3 i_5 | 1 |  | 1 |  |  | 1 |  |  |  |  |  |  |  | 1 |
| O2 | i_7 i_4 i_8 | 1 |  | 1 |  |  |  |  |  | 1 |  |  |  | 1 |  |
| O3 | i_7 i_4 i_6 | 1 |  |  |  |  |  | 1 |  |  |  |  |  | 1 |  |
| O4 | i_5 i_2 i_8 |  | 1 |  | 1 |  |  |  |  |  |  | 1 |  | 1 |  |
| O5 | i_5 i_2 i_6 |  | 1 |  |  | 1 |  | 1 |  |  |  |  | 1 | 1 |  |
| O6 | i_7 i_4 i_6 | 1 |  |  | 1 |  |  | 1 |  |  |  |  | 1 | 1 |  |

Fig. 12

| G | ZS | K1 | K2 | A | B | C | D | E | F | G | H | I | K | S_ab1 | S_ab2 |
|---|---|---|---|---|---|---|---|---|---|---|---|---|---|---|---|
| G1 | i_5_i_6_i_2 | 1 |   |   | 1 |   |   | 1 |   |   | 1 |   |   | 1 | 1 |
| G2 | i_2 |   | 1 |   | 1 |   |   |   |   |   |   |   |   | 1 | 1 |
| G3 | i_3 | 1 |   |   |   |   |   |   |   | 1 |   |   |   | 1 | 1 |
| G4 | i_4 |   | 1 | 1 |   |   |   |   |   |   |   |   |   | 1 | 1 |
| G5 | i_5 | 1 |   |   |   | 1 |   |   |   |   | 1 |   |   | 1 | 1 |
| G6 | i_6 |   | 1 |   |   | 1 |   | 1 |   |   |   |   |   | 1 | 1 |
| G7 | i_7 | 1 |   |   |   |   | 1 |   | 1 |   |   | 1 |   | 1 | 1 |
| G8 | i_2_ZW_8_i_7 |   | 1 |   |   |   | 1 |   | 1 |   |   |   |   | 1 | 1 |

R- GEAR

| | ZS | K1 | K2 | A | B | C | D | E | F | G | H | I | K | S_ab1 | S_ab2 |
|---|---|---|---|---|---|---|---|---|---|---|---|---|---|---|---|
| R1 | i_R_i_5_ZW_8 | 1 |   |   |   |   |   |   | 1 |   | 1 |   |   | 1 |   |
| R2 | i_3_i_R_i_2 | 1 |   |   | 1 |   |   |   | 1 |   |   |   |   |   | 1 |
| R3 | ZW_8_i_4_i_R | 1 |   |   |   |   |   |   | 1 |   |   |   | 1 |   | 1 |
| R4 | i_3_i_R_i_2 | 1 |   |   | 1 |   |   |   |   | 1 |   |   |   |   | 1 |

| | | K1 | K2 | A | B | C | D | E | F | G | H | I | K | S_ab1 | S_ab2 |
|---|---|---|---|---|---|---|---|---|---|---|---|---|---|---|---|
| C1 | i_4_i_7_i_3 |   | 1 | 1 |   | 1 | 1 | 1 |   |   |   |   |   |   |   |
| C2 | i_2_i_7_i_3 |   | 1 |   |   | 1 | 1 | 1 |   | 1 |   |   |   |   |   |
| C3 | i_2_i_7_i_5 |   | 1 | 1 |   |   | 1 | 1 | 1 | 1 |   |   |   |   |   |
| C4 | i_3_i_6_i_2 |   | 1 |   |   | 1 | 1 | 1 |   | 1 |   |   |   |   |   |

OVERDRIVE

| | | K1 | K2 | A | B | C | D | E | F | G | H | I | K | S_ab1 | S_ab2 |
|---|---|---|---|---|---|---|---|---|---|---|---|---|---|---|---|
| O1 | i_6_i_3_i_7 |   | 1 |   |   |   | 1 | 1 |   | 1 | 1 |   |   | 1 |   |
| O2 | i_6_i_5_i_7 |   | 1 |   |   |   | 1 | 1 |   | 1 | 1 |   |   | 1 |   |
| O3 | i_7_i_4_i_6 | 1 |   | 1 |   |   | 1 | 1 |   |   | 1 |   |   |   | 1 |
| O4 | i_7_i_2_i_6 | 1 |   |   |   |   | 1 | 1 |   |   |   |   |   |   | 1 |

| G | ZS | K1 | K2 | A | B | C | D | E | F | G | H | I | K | S_ab1 | S_ab2 |
|---|---|---|---|---|---|---|---|---|---|---|---|---|---|---|---|
| G1 | i_3·i_4·i_2 | 1 | | | | | | | | | | | | 1 | 1 |
| G2 | i_2 | | 1 | | 1 | | | | | | | | 1 | 1 | 1 |
| G3 | i_3 | 1 | | | 1 | | | | | | | | | 1 | 1 |
| G4 | i_4 | | 1 | | | | | | 1 | | | | | 1 | 1 |
| G5 | i_5 | 1 | | | | | | 1 | | | | | | 1 | 1 |
| G6 | i_6 | | 1 | | | | 1 | | | | | | | 1 | 1 |
| G7 | i_7 | 1 | | | | | | | | | 1 | | | | 1 |
| G8 | i_2·ZW_8·i_7 | | 1 | | | | | | | | | 1 | | | 1 |

R-GEAR

| | ZS | K1 | K2 | A | B | C | D | E | F | G | H | I | K | S_ab1 | S_ab2 |
|---|---|---|---|---|---|---|---|---|---|---|---|---|---|---|---|
| R1 | ZW_8·i_R·i_4 | 1 | | 1 | | | | | 1 | 1 | | | | | 1 |
| R2 | i_3·i_6·i_R | 1 | | 1 | | | | 1 | | | | | | 1 | |

CRAWLER

| | ZS | K1 | K2 | A | B | C | D | E | F | G | H | I | K | S_ab1 | S_ab2 |
|---|---|---|---|---|---|---|---|---|---|---|---|---|---|---|---|
| C1 | i_2·i_5·i_3 | 1 | | | 1 | 1 | | 1 | 1 | 1 | | | | | 1 |
| C2 | i_3·i_6·i_2 | 1 | | | 1 | 1 | 1 | | | | | | | 1 | |

OVERDRIVE

| | ZS | K1 | K2 | A | B | C | D | E | F | G | H | I | K | S_ab1 | S_ab2 |
|---|---|---|---|---|---|---|---|---|---|---|---|---|---|---|---|
| O1 | i_4·i_3·i_7 | | 1 | | | | 1 | 1 | | 1 | 1 | | | 1 | 1 |
| O2 | i_6·i_3·i_5 | | 1 | | | | 1 | 1 | | | | | | 1 | 1 |
| O3 | i_5·i_2·i_6 | | 1 | | | | 1 | | | | 1 | | | | 1 |

Fig. 14

DOUBLE CLUTCH TRANSMISSION

This application claims priority from German patent application serial no. 10 2009 002 358.5 filed Apr. 14, 2009.

FIELD OF THE INVENTION

The present invention relates to a double clutch transmission system.

BACKGROUND OF THE INVENTION

A six- or seven-speed transmission is known from printed publication DE 103 05 241 A1. The double clutch transmission comprises two clutches, each connected with its input side to the input shaft and with its output side to one of the two transmission input shafts respectively. The two transmission input shafts are arranged coaxially to one another. Moreover, two countershafts are arranged axially parallel to the two transmission input shafts, the idler gears of which engage with fixed gears of the transmission input shafts. Moreover, axially displaceable coupling devices are held in a rotationally fixed manner on the countershafts, in order to shift the respective toothed gear wheels. The respectively selected ratio will be transmitted via the output gears to a differential gear. In order to implement the desired ratio step in the double clutch transmission of the prior art, a multitude of gear planes is necessary, such that a significant amount of construction space is needed for the installation.

Moreover, a spur-gear multi-speed transmission is known from printed publication DE 38 22 330 A1. The spur-gear multi-speed transmission comprises a double clutch transmission that is shiftable under load, one part of which is connected with an input shaft and another other part with a rotatable hollow input shaft placed on the input shaft. For certain ratios, the input shaft can be coupled via a shift element with the input hollow shaft.

A powershift transmission is known from publication DE 10 2004 001 961 A1 having two clutches that are allocated each to a subtransmission. The transmission input shafts of the two subtransmissions are arranged coaxially to one another and are meshed via fixed gears with idler gears of the allocated shaft elements. The respective idler gears of the countershaft can be connected in a rotationally fixed manner with the respective countershaft through allocated shift elements. An eight-speed transmission is known from this publication having another shift element to couple the two transmission input shafts in order to obtain another transmission ratio step. In this embodiment, the seven-speed transmission requires at least six gear wheel planes in the subtransmission in order to obtain the transmission ratio steps. This creates an undesirable extension of the construction length in axial direction, thus, considerably limiting the installation possibility in a vehicle.

Moreover another powershift transmission is known from publication DE 10 2005 028 532 A1 comprising two input shafts and only one countershaft. For example, an eight-speed transmission requires in this embodiment more than seven gear planes, in order to obtain the transmission ratio steps, in particular the reverse ratios. This creates an undesirable extension of the installation length in axial direction.

SUMMARY OF THE INVENTION

The object of the present invention is to propose a double clutch transmission of the type mentioned above whereby several power shiftable transmission ratio steps can be realized as reasonably as possible and with as few components parts as possible and with low construction space.

In accordance therewith, a construction space-optimized double clutch transmission with two clutches is proposed, the input sides of which are connected with an input shaft and the output sides of which are connected respectively with one of two transmission input shafts coaxially arranged to one another. The double clutch transmission comprises at least two countershafts or similar, on which gears embodied as idler gears are rotatably arranged, while on both input shafts rotationally fixed gear wheels embodied as fixed gears are provided, which engage at least some of the idler gears. Moreover, several coupling devices are provided for a rotationally fixed connection of an idler gear with a countershaft. The double clutch transmission of the invention has on each of the countershafts an output gear or constant pinion gear respectively, which are each coupled with gearing of an input shaft, in order to connect the respective countershaft with the output and at least one shift element for the rotationally fixed connection of two toothed gear wheels, whereby several power shiftable gears can be performed.

In accordance with the invention, the suggested double clutch transmission has preferably six gear planes, with which at least eight power shiftable gears with a low construction space requirement can be realized. For example, a maximum of six gear planes can be created preferably through at least two dual gear planes and at least two single gear planes. Also other configurations are possible. In each dual gear plane an idler gear of the first and second countershafts each are allocated to a fixed gear of one of the input transmission shafts and whereby at least in one of the dual gear planes, at least one idler gear can be used for at least two gears. For the single gear plane, one idler gear of one of the countershafts is allocated to a fixed gear of one of the input shafts. For the suggested double clutch transmission, at least one winding path gear can be shifted via an open winding path gear coupling device.

Preferably, in each dual gear plane of the suggested double clutch transmission, each idler gear can be used for several gears. Because of the possible multiple applications of idler gears, a maximum number of ratios can be realized for the suggested double clutch transmission with as few gear planes as possible, while preferably the first eight forward gears are power shiftable during sequential execution.

To optimize the gradation for the suggested double clutch transmission of the invention, a dual gear plane can be replaced by two single gear planes, in that a fixed gear is replaced by two fixed gears. Thus, a particularly harmonious, progressive gear stepping can be achieved. It is also possible to replace two single gear planes with one dual gear plane.

Preferably, the suggested double clutch transmission can be designed as 8-speed gear box with at least eight power shiftable gear steps. However, transmissions with different number of gears are possible. Because of the short construction design as opposed to known transmission designs, the double clutch transmission of the invention is particularly suitable for a front transversal design of a vehicle. However, also other installation types are possible depending on type and construction space of the respective vehicle.

Preferably, for the suggested double clutch transmission, the first and/or eighth forward gear can be a winding path gear. In addition, at least one reverse gear and/or other gears, such as crawler gears or overdrive gears can also be designed as a winding path gear and possibly designed as power shiftable. For example, the first power-shiftable forward gear or the highest power shiftable gear can be a winding path gear.

In addition to the at least one winding path gear coupling device, as more or less a winding path gear shift element on at least one of the constant pinions, other shift elements can be placed on the first and/or on the second countershaft to realize additional winding path gears.

For example, depending on design, four shiftable idler gears each may be allocated to the first countershaft and to the second countershaft, which idler gears each engage with fixed gears of the allocated transmission input shafts.

For the suggested double clutch transmission system, at least one winding path gear shift element can be allocated to at least one countershaft to realize the winding path gears. Optionally, additional winding path gear shift elements can be provided, for example in form of the first or second countershaft.

If the last or second to last transmission ratio step is designed higher than the one immediately preceding it, a particularly high output torque or input power can be provided for a downshift drive demand.

In accordance with the invention it can be provided that via the one or also via one additional shift element on the first and/or second countershaft, the idler gear of the second subtransmission can be connected with the idler gear of the first subtransmission, so that via the shift element at least one winding path gear can be shifted.

For the double clutch transmission of the system, winding path gears can be realized on the output gear during opened coupling devices, whereby the toothed gear wheels of both subtransmissions will be connected with one another, in order to realize therewith a power flow via both subtransmissions. The winding path gear coupling devices are allocated to the constant pinions, in order to disengage the same from the allocated countershaft, in order to realize winding path gears, thereby making the transmission input shafts dependent on one another.

For the double clutch transmission, the arrangement of the shift elements to couple two specific idler gears can be varied, so that the shift elements must not be arranged between the idler gears to be coupled. Thus, other arrangement positions of the respective shift elements are possible, in order to optimize the linking to an actuator system.

Optionally, for the suggested double clutch transmission there can be provided at least one additional gear stage $ZW\_x$, which will not be used for another forward gear.

A possible embodiment of the invention can provide that the fixed gears of the second transmission input shaft of the second subtransmission are associated with one first gear plane designed as a dual gear plane and a second gear plane designed as a dual gear plane, and that the fixed gears of the first transmission input shaft of the first subtransmission will be associated with a third gear plane designed as a dual gear plane, a fourth gear plane designed as a single gear plane and a fifth gear plane designed as a single gear plane.

For example, within the scope of a further embodiment of the invention, it can be provided that the fixed gears of the second transmission input shaft of the second subtransmission can be associated with a first gear plane designed as a dual gear plane, a second gear plane designed as a single gear plane and a third gear plane designed as a single gear plane, and that the fixed gears of the first transmission input shaft of the second subtransmission can be associated with a fourth gear plane designed as a dual gear plane, a fifth gear plane designed as a single gear plane and a sixth gear plane designed as a single gear plane.

In accordance with the invention also the fixed gears of the second transmission input shafts of the second subtransmission can be associated with a first gear plane designed as a dual gear plane, a second gear plane designed as a single gear plane and a third gear plane designed as a single gear plane, and the fixed gears of the first transmission input shaft of the first subtransmission can be associated with a fourth gear plane designed as a single gear plane, a fifth gear plane designed as a single gear plane and a sixth gear plane designed as a dual gear plane.

It is also possible that the fixed gears of the second transmission input shaft of the second subtransmission can be associated with a first gear plane designed as a dual gear plane, a second gear plane designed as a single gear plane and a third gear plane designed as a single gear plane, and that the fixed gears of the first transmission input shaft of the first subtransmission can be associated with a fourth gear plane designed as a dual gear plane and a fifth gear plane designed as a dual gear plane.

In order to provide the required reversal of rotation for the realization of reverse gears for the double clutch transmission of the invention at least one intermediate gear or similar can be used, which e.g., is arranged on an intermediate shaft. It is also possible that one of the idler gears of a countershaft serves as intermediate gear for at least one reverse gear. That means that for the reverse gear ratio, no additional intermediate shaft is necessary, because one of the idler gears is engaged with a fixed gear as well as with another shiftable idler gear of the other countershaft. Thus, the intermediate gear necessary for the reverse gear is arranged on a countershaft as a shiftable idler gear and serves also to realize at least one other forward gear. The intermediate gear may also be designed as stepped gear independent of whether the same is arranged on the countershaft or on an additional intermediate shaft. It is also possible that the intermediate gear is not arranged on one of the already existing countershafts, but instead, for example, is provided on another separate shaft, e.g. a third countershaft.

In order to obtain the desired transmission ratio steps, the double clutch transmission of the invention can have at least a dual action coupling devise or similar on each countershaft. The intended coupling devices can when in an activated or closed position depending on respective actuating direction connect one associated with idler gear each with the countershaft. Moreover, on at least one of the countershafts also a single action device or similar can be placed. As coupling devices, for example, clutches that can be activated hydraulically, electrically, pneumatically, mechanically or even positively engaged dog clutches as well as any type of synchronization device can be used, which serve to connect an idler gear with a countershaft in a rotationally fixe manner. It is possible, that a dual action coupling device can be replaced by two single action coupling devices or vice versa.

It is conceivable that the given placement possibilities of the gear wheels will be varied and also the number of gear wheels as well as the number of coupling devices will be changed, in order to still realize more power shiftable or non-power shiftable gears and construction space and components savings for the suggested double clutch transmission. In particular, fixed gears of dual gear planes can be divided into two fixed gears of two single gear planes. Thus, gear steps can be improved. Moreover, it is possible to exchange the countershafts. The transmissions can also be exchanged in mirror image around a vertical axis. At the same time the hollow shaft and the solid shaft can be exchanged. Thus, it is possible, for example, to place the smallest gear wheel on the solid shaft, to further optimize the utilization of the available construction space. Moreover, adjacent gear planes can be exchanged, for example, to optimize shaft deflection and/or to optimally link a shift actuating system. Also, the respective placement positions of the coupling devices on the gear plane can be varied. In addition, the action direction of the coupling device can be changed.

The gear numberings used here were freely defined. It is also possible to add a crawler or "crawler gear" and/or an overdrive or "overdrive gear", in order to improve for a vehicle, e.g. the off road characteristics or the acceleration behavior. Furthermore, for example, a first gear can be left out to better optimize the entirety of the gear steps. During this step, the gear numbering varies accordingly.

Independent of the respective design variation of the double clutch transmissions, the input shaft and the output shafts preferably can also not be placed coaxially to one another, which realizes a particular installation-space-saving placement. For example, the shafts that had been placed one after the other, also can be displaced slightly from one another. With respect to this placement, a direct gear is possible with a ratio of one via gear tooth meshing and can advantageously be placed relatively freely on the sixth through ninth gear. Also other placement possibilities of the input shaft and output shaft are conceivable.

The proposed double clutch transmission is preferably equipped with an integrated output stage. The output stage may comprise a fixed gear on the output shaft as the output gear, which meshes with a first output gear as the constant pinion of the first countershaft and with a second output gear as the constant pinion of the second countershaft. Optionally, both output gears can be designed as shiftable gears. In order to shift the respective output gear, a winding path gear coupling device may be associated, for example, which in the disengaged state releases the connection between the associated countershaft and the output gear in order to shift winding path gears.

Advantageously, the lower forward gears and the reverse gears can be actuated by a start-up or shifting clutch in order to focus higher loads on this clutch and thereby be able to implement the second clutch in a more space-saving and cost-effective manner. In particular, the gear planes can be arranged in the proposed double clutch transmission such that starting can be carried both by way of the inner transmission input shaft or the outer transmission input shaft, and therefore by way of the clutch that is better suited, which is also possible for a concentrically arranged, radially nested construction of the double clutch. For this purpose, the gear planes can be arranged and/or exchanged accordingly mirror-symmetrically.

Independent of the respective variant embodiment, for example, the suggested gear planes can be exchanged in the double clutch transmission.

BRIEF DESCRIPTION OF THE DRAWINGS

Below, the present invention will be explained in particular with the help of the drawings as follows:

FIG. 2 is a gear shift pattern of the first variant embodiment according to FIG. 1;

FIG. 4 is a gear shift pattern of the second variant embodiment according to FIG. 3;

FIG. 6 is a gear shift pattern of the third variant embodiment according to FIG. 5;

FIG. 8 is a gear shift pattern of the fourth variant embodiment according to FIG. 7;

FIG. 10 is a gear shift pattern of the fifth variant embodiment according to FIG. 9;

FIG. 12 is a gear shift pattern of the sixth variant embodiment according to FIG. 11;

FIG. 14 is a gear shift pattern of the seventh variant embodiment according to FIG. 13.

DETAILED DESCRIPTION OF THE PREFERRED EMBODIMENTS

Figure 1:
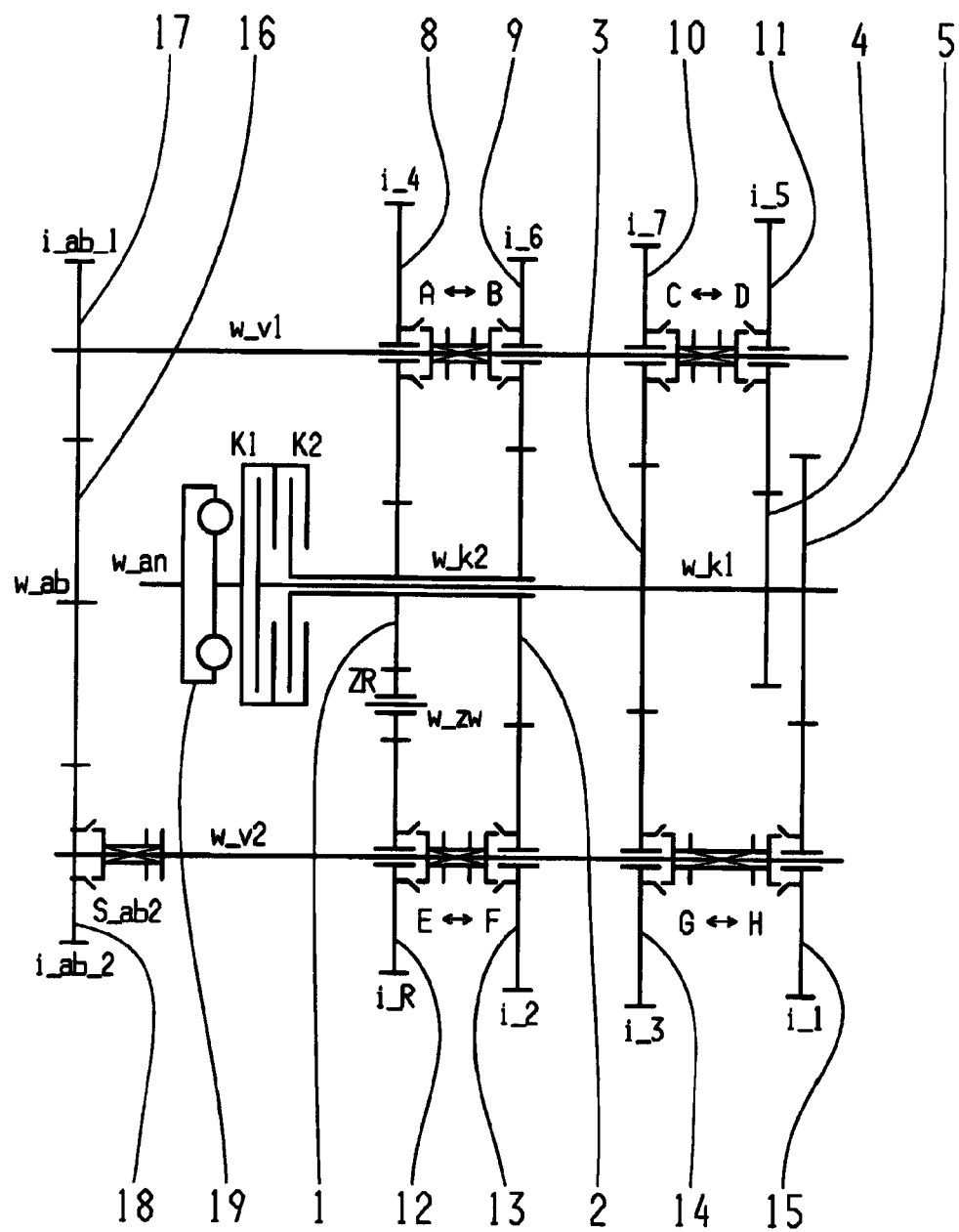
FIG. 1 is a schematic view of a first variant embodiment of an 8-speed double clutch transmission of the invention.

FIGS. 1, 3, 5, 7, 9, 11 and 13 each show a possible variant embodiment of an 8-speed double clutch transmission. The respective gear shift patterns to the various variant embodiments are shown in tabular form in FIGS. 2, 4, 6, 8, 10, 12 and 14.

The 8-speed double clutch transmission comprises two clutches K1, K2, the input sides of which are connected with an input shaft wan and the output sides of which are connected respectively with one of two transmission input shafts w_k1, w_k2 coaxially aligned with one another. Moreover, a torsion vibration damper 19 can be placed at the input shaft wan. In addition, two countershafts w_v1, w_v2 are provided, on which are positioned toothed gear wheels designed as idler gear 8, 9, 10, 11, 12, 13, 14, 15. On both transmission input shafts w_k1, w_k2 are positioned in a rotationally fixed manner toothed gear wheels designed as fixed gears 1, 2, 3, 4, 5, 6, that at least in part mesh with the idler gears 7, 8, 9, 10, 11, 12, 13, 14, 15.

In order to connect the idler gears 8, 9, 10, 11, 12, 13, 14, 15 with the respective countershaft w_v1, w_v2, several coupling devices A, B, C, D, E, F, G, H, that can be activated, are provided on the countershafts w_v1, w_v2. Also on the two countershafts w_v1, w_v2, are positioned as constant pinions, output gear wheels 17, 18, which are each coupled with gearing of a fixed gear 16 of an output shaft w_ab, whereby output gear wheels 17, 18 are associated with respective output steps i_ab_1, i_ab_2.

In addition to the coupling devices A, B, C, D, E, F, G, H, that realize in activated state a rotationally fixed connection between a toothed gear wheel and the allocated countershaft w_v1, w_v2, there are allocated on the first and/or the second countershaft w_v1, w_v2, winding path gear coupling devices S_ab1, S_ab2 of the output steps i_ab1, i_ab2. When the device S_ab1 or S_ab2 is open, the rotational fixed connection between the output gear 17 or 18 and the first countershaft w_v1 or the second countershaft w_v2 is disengaged. For the double clutch transmission there can be provided, if required, at least one winding path gear shift element I or K for a rotationally fixed connection of two gear wheels of a countershaft w_v1, w_v2, so that via the activated shift elements I or K at least one winding path gear can be realized.

With the shift element K, the idler gears 13 and 14 of the second countershaft w_v2 will be connected with one another, in order to couple the first subtransmission with the second subtransmission, so that winding path gears can be shifted. Also optionally, one shift element I can be used, with which the idler gears 9 and 10 of the first countershaft w_v1 can be connected with one another, in order to couple the first subtransmission with the second subtransmission, so that additional winding path gears can be shifted.

According to the invention the double clutch transmission has six gear planes 8-12, 9-2, 3-13, 9-13, 10-4, 5-14, 10-14, 11-4, 11-5, 5-15, 6-15, 11-15, and each variant embodiment has at least two dual gear planes 8-12, 9-13, 10-14, 11-15, and at least two single gear planes 9-2, 3-13, 10-4, 5-14, 11-4, 11-5, 5-15, 6-15, so that the winding path gears are shiftable at least when winding path gear coupling device S_ab1 or S_ab2 is disengaged. As shift elements I or K respectively a claw or similar can be used to connect two gear wheels.

In the first variant embodiment according to FIG. 1, the first gear plane 8-12 as dual gear plane, the fixed gear 1 of the second transmission input shaft w_k2 meshes with the idler gear 8 of the first countershaft w_v1 and with an intermediate gear ZR on an intermediate shaft w_zw to reverse the rotation for the reverse gear ratio, while the intermediate gear ZR also meshes with the idler gear 12 of the second countershaft w_v2. Whereas in the sixth variant embodiment according to FIG. 11 in the first gear plane 8-12 as dual gear plane, the fixed gear 1 of the second transmission input shaft w_k2 meshes with the idler gear 8 of the first countershaft w_v1 and with the idler gear 12 of the second countershaft w_v2. In the first variant embodiment, the second gear plane 9-13 meshes as dual gear plane, the fixed gear 2 of the second transmission input shaft w_k2 meshes not only with the idler gear 9 of the first countershaft w_v1, but also with the idler gear 13 of the second countershaft w_v2. Whereas in the sixth variant embodiment according to FIG. 11 in the second gear plane 9-13 designed as a dual gear plane, the fixed gear 2 of the second transmission input shaft w_k2 meshes not only with the idler gear 9 of the first countershaft w_v1, but also with the intermediate gear ZR to reverse the rotation for the reverse gear ratios, while the intermediate gear ZR meshes also with the idler gear 13 of the second countershaft w_v2. For the first and the eleventh variant embodiment, in the third gear plane 10-14 designed as a dual gear plane, the fixed gear 3 of the first transmission input shaft w_k1 meshes not only with the idler gear 10 of the first countershaft w_v1, but also with the idler gear 14 of the second countershaft w_v2. For the fourth gear plane 11-4 designed as a single gear plane, the fixed gear 4 of the first transmission input shaft w_k1 meshes with the idler gear 11 of the first countershaft w_v1. In the fifth gear plane 5-15 designed as a single gear plane, the fixed gear 5 of the first transmission input shaft w_k1 meshes with the idler gear 15 of the second countershaft w_v2.

In the second and third variant embodiment according to FIGS. 3 thru 6, in the first gear plane 8-12 designed as a dual gear plane, the fixed gear 1 of the second transmission input shaft w_k2 meshes with the idler gear 8 of the first countershaft w_v1 and with the idler gear 12 of the second countershaft w_v2. In the second gear plane 9-2 designed as a single gear plane, the fixed gear 2 of the second transmission input shaft w_v2 meshes with the idler gear 9 of the first countershaft w_v1. In the third gear plane 3-13 designed as a single gear plane, the fixed gear 3 of the second transmission input shaft w_k2 meshes with the idler gear 13 of the second countershaft w_v2. In the fourth gear plane 10-14 designed as a dual gear plane, the fixed gear 4 of the first transmission input shaft w_k1 meshes with the idler gear 10 of the first countershaft w_v1 and with the intermediate gear ZR to reverse the rotation for the reverse gear ratios, while the intermediate gear ZR meshes with the idler gear 14 of the second countershaft w_v2. In the fifth gear plane 11-5 designed as a single gear plane, the fixed gear 5 of the first transmission input shaft w_k1 meshes with the idler gear 11 of the first countershaft w_v1. Finally, in the sixth gear plane 6-15 designed as a single gear plane, the fixed gear 6 of the first transmission input shaft w_k1 meshes with the idler gear 15 of the second countershaft w_v2.

Figure 7:
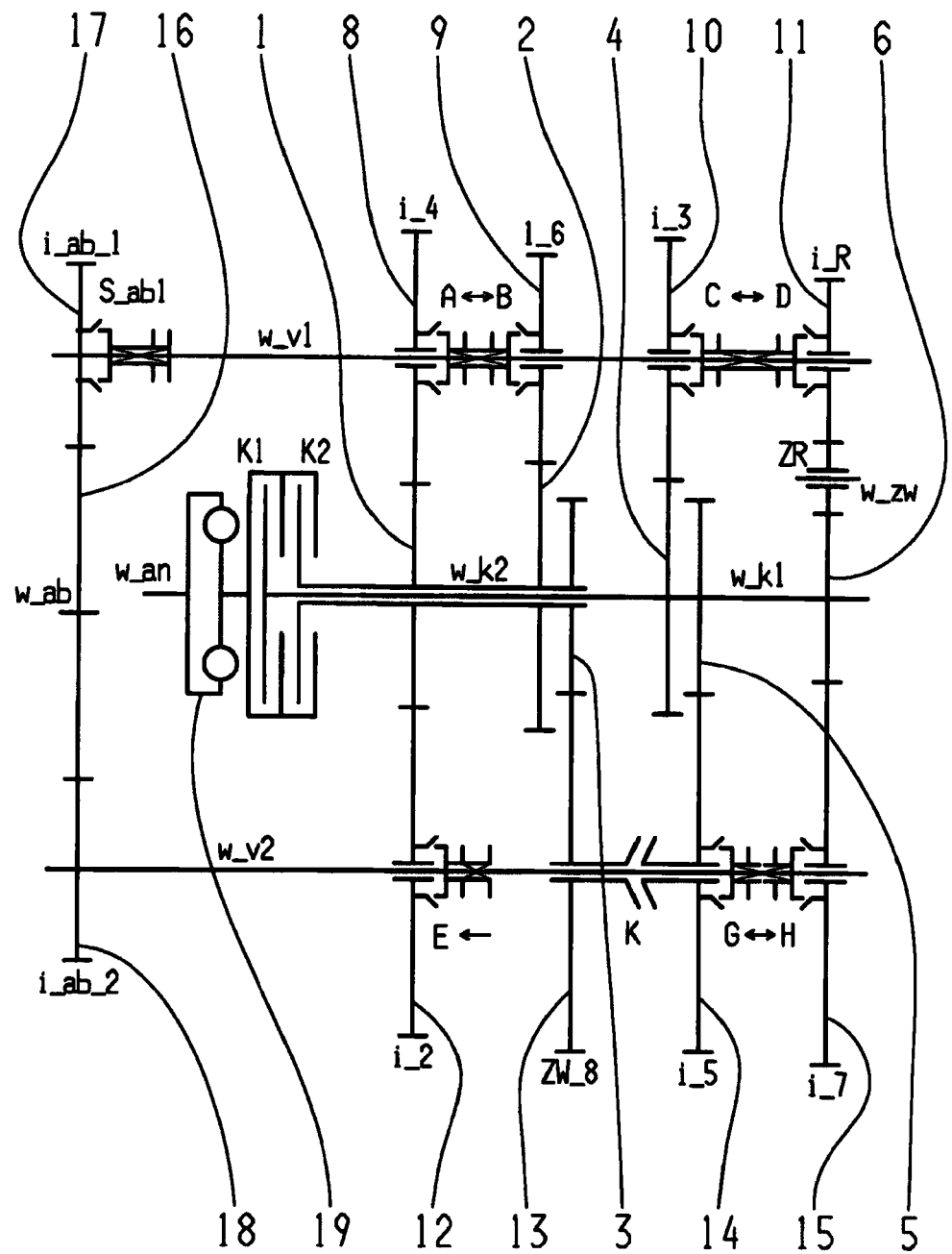
FIG. 7 is a schematic view of a fourth variant embodiment of the 8-speed double clutch transmission of the invention.

In the fourth variant embodiment according to FIGS. 7 and 8 in the first gear plane 8-12 designed as a dual gear plane, the fixed gear 1 of the second transmission input shaft w_k2 meshes with the idler gear 8 of the first countershaft w_1 and with the idler gear 12 of the second countershaft w_v2. In the second gear plane 9-2 designed as a single gear plane, the fixed gear 2 of the second transmission input shaft w_v2 meshes with the idler gear 9 of the first countershaft w_v1. In the third gear plane 3-13 designed as a single gear plane, the fixed gear 3 of the second transmission input shaft w_k2 meshes with idler gear 13 of the second countershaft w_v2. In the fourth gear plane 10-4 designed as a single gear plane, the fixed gear 4 of the first transmission input shaft w_k1 meshes with the idler gear 10 of the first countershaft w_v1. In the fifth gear plane 5-14 designed as a single gear plane, the fixed gear 5 of the first transmission input shaft w_k1 meshes with the idler gear 14 of the second countershaft w_v2. Finally, in the sixth gear plane 11-15 designed as a dual gear plane, the fixed gear 6 of the first transmission input shaft w_k1 meshes not only with the idler gear 15 of the second countershaft w_v2, but also with the intermediate gear ZR to reverse the rotation for the reverse gear ratios, while the intermediate gear ZR meshes also with the idler gear 11 of the first countershaft w_v1.

Figure 9:
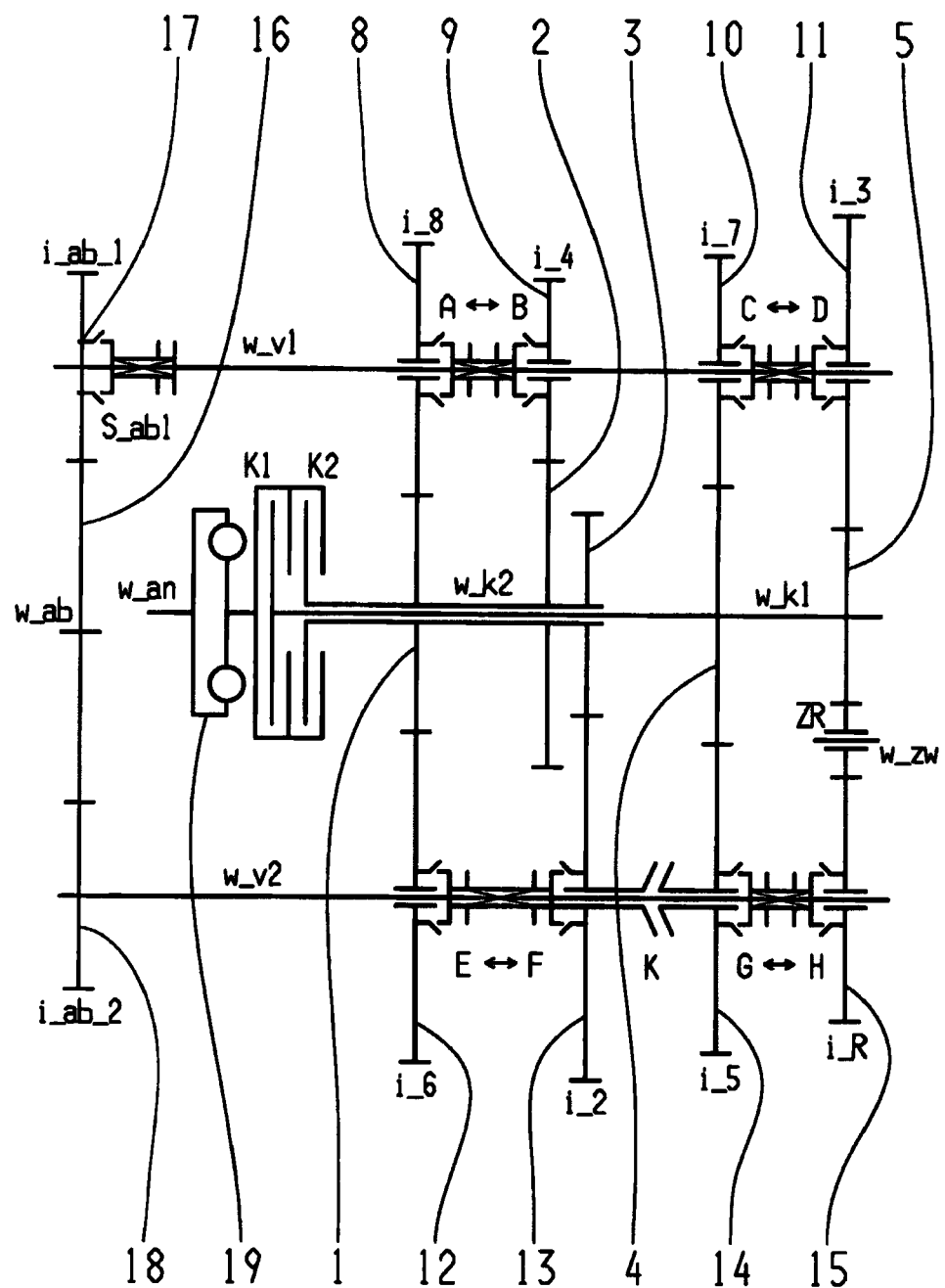
FIG. 9 is a schematic view of a fifth variant embodiment of the 8-speed double clutch transmission of the invention.

In the fifth variant embodiment according to the FIGS. 9 and 10 in the first gear plane 8-12 designed as a dual gear plane, the fixed gear 1 of the second transmission input shaft w_k2 meshes not only with the idler gear 8 of the first countershaft w_v1, but also with the idler gear 12 of second countershaft w_v2. In the seventh variant embodiment according to the FIGS. 13 and 14 in the first gear plane 8-12 designed as a dual gear plane, the fixed gear 1 meshes not only with the idler gear 12 of the second countershaft w_v2, but also with the intermediate gear to reverse the rotation for the reverse gear ratios, while the intermediate gear ZR meshes also with the idler gear 8 of the first countershaft w_v1. In the second gear plane 9-2 designed as a single gear plane, the fixed gear 2 of the second transmission input shaft w_v2 meshes with the idler gear 9 of the first countershaft w_v1. In the third gear plane 3-13 designed as a single gear plane, the fixed gear 3 of the second transmission input shaft w_k2 meshes with the idler gear 13 of the second countershaft w_v2. In the fourth gear plane 10-14 designed as a dual gear plane, the fixed gear 4 meshes with the first transmission input shaft w_k1 and with the idler gear 10 of the first countershaft w_v1 and with the idler gear 14 of the second countershaft w_v2. In the fifth variant embodiment, the fifth gear plane 11-15 designed as a dual gear plane, the fixed gear 5 of the first transmission input shaft w_k1 meshes with the idler gear 11 of the first countershaft w_v1 and with the intermediate gear ZR to reverse the rotation for the reverse gear ratios, while the intermediate gear ZR meshes also with the idler gear 15 of the second countershaft w_v2. Whereas in the seventh variant embodiment in the fifth gear plane 11-15 designed as a dual gear plane, the fixed gear 5 of the first transmission input shaft w_k1 meshes not only with the idler gear 11 of the first countershaft w_v1, but also with the idler gear 15 of the second countershaft w_v2.

In the first, second, third, fifth and sixth variant embodiment according to FIGS. 1, 3, 5, 9 and 11, there are provided on the first countershaft w_v1 two dual-acting coupling devices A-B and C-D, that are placed in such a way that the activated coupling device A, firmly connects the idler gear 8, the activated coupling device B firmly connects the idler gear 9, the activated coupling device C firmly connects the idler gear 10 and the activated coupling device D firmly connects the idler gear 11 each with the first countershaft w_v1. Moreover, on the second countershaft w_v2 there are provided two dual-acting coupling devices E-F and G-H, that are placed in such a way that the activated coupling device E firmly connects the idler gear 12, the activated coupling device F firmly connects the idler gear 13, the activated coupling device G firmly connects the idler gear 14 and the activated coupling device H firmly connects idler gear 15 each with the second countershaft w_v2.

In the fourth variant embodiment according to the FIGS. 7 and 8 on the first countershaft w_v1 there are provided two dual-acting coupling device A-B and C-D that are placed in such a way that the activated coupling device A firmly connects the idler gear 8, the activated coupling device B firmly connects the idler gear 9, the activated coupling device C firmly connects the idler gear 10 and the activated coupling device D firmly connects the idler gear 11 each with the first countershaft w_v1. On the second countershaft w_v2 there are provided one dual-acting coupling device G-H and one single-acting coupling device E, that are placed in such a way that the activated coupling device E firmly connects the idler gear 12, the activated coupling device G firmly connects the idler gear 14 and the activated coupling device H firmly connects the idler gear 15 each with the second countershaft w_v2.

Figure 13:
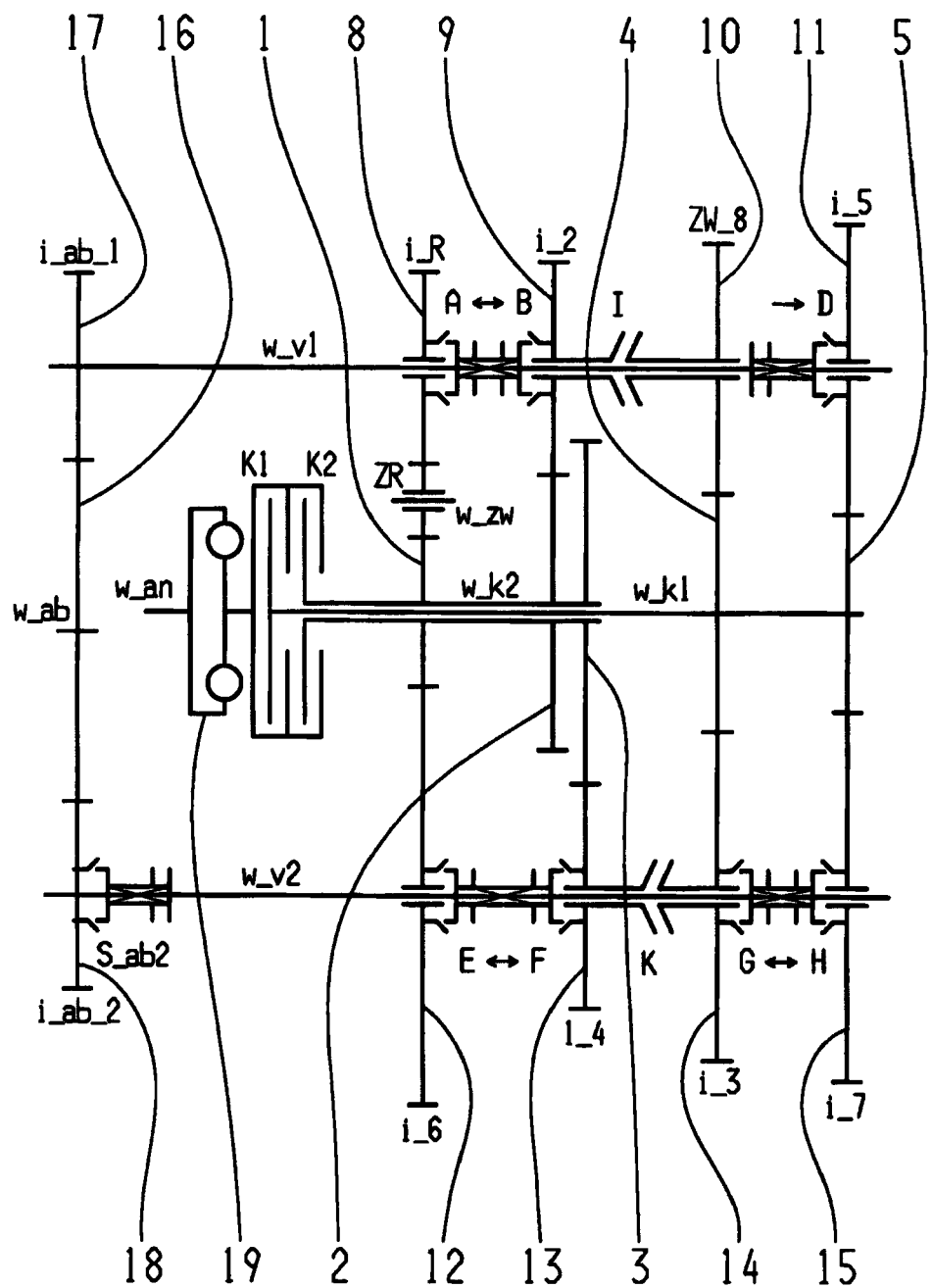
FIG. 13 is a schematic view of a seventh variant embodiment of the 8-speed double clutch transmission of the invention.

In the seventh variant embodiment according to the FIGS. 13 and 14 on the first countershaft are provided one dual-acting coupling device A-B and one single-acting coupling device D, which are placed in such a way that the activated coupling device A firmly connects the idler gear 8, the activated coupling device B firmly connects the idler gear 9 and the activated coupling device D firmly connects the idler gear 11 each with the first countershaft w_v1. On the second countershaft w_v2 two dual-acting coupling devices E-F and G-H are provided that are placed in such a way that the activated coupling device E firmly connects the idler gear 12, the activated coupling device F firmly connects the idler gear 13, the activated coupling device G firmly connects the idler gear 14 and the activated coupling device H firmly connects the idler gear 15 each with the second countershaft w_v2.

Independent of the respective variant embodiment, there is provided for the double clutch transmission according to the invention an integrated output stage with the output gear 17 and the output gear 18. The output gear 17 and the output gear 18 each mesh with a fixed gear 16 of the output shaft w_ab.

Moreover, it follows from the double clutch transmission according to the invention that at least the forward gears G1 thru G8 are feasibly power shiftable. Depending on the respective variant embodiment at least one reverse gear ratio and/or crawler gears and/or overdrive gears, can additionally be designed also as power shift winding path gears. Particulars for each variant embodiment result from the shift patterns described hereinafter.

The table represented in FIG. 2 shows an example of a shift pattern for the first variant embodiment of the 8-speed double clutch transmissions according to FIG. 1.

The shift pattern shows that the first forward gear G1 can be shifted via the first clutch K1 and via the activated coupling device H, that the second forward gear G2 can be shifted via the second clutch K2 and via the activated coupling device F, that the third forward gear G3 can be shifted via the first clutch K1 and via the activated coupling device G, that the fourth forward gear G4 can be shifted via the second clutch K2 and via the activated coupling device A, that the fifth forward gear G5 can be shifted via the first clutch K1 and via the activated coupling device D, that the sixth forward gear G6 can be shifted via the second clutch K2 and via the activated coupling device B, that the seventh forward gear G7 can be shifted via the first clutch K1 and via the activated coupling device C, and that the eighth forward gear G8 can be shifted via the second clutch K2, via the activated coupling device C, via the activated coupling device F and via the activated coupling device H as a winding path gear by disengaging the coupling device S_ab2. Thus, at least the first eighth forward gears can be power shifted (lsb.).

In addition, for example, a reverse gear R1 can be shifted via the second clutch K2 and via the activated coupling device E. A reverse gear R2 can be shifted via the first clutch K1, via the activated coupling device E and during activated shift element K as a winding path gear. A reverse gear R3 can be shifted via the first clutch K1, via the activated coupling device A, via the activated coupling device D and via the activated coupling device E as a winding path gear by disengaging the coupling device S_ab1. Moreover, a reverse gear R4 can be shifted via the first clutch K1, via the activated coupling device B, via the activated coupling device D and via the activated coupling device E and the disengaged coupling device S_ab1 as a winding path gear.

In addition, a crawler gear C1 can be shifted via the second clutch K2 and via the activated coupling device H as well as during activated shift element I as a winding path gear. A crawler gear C2 can be shifted via the second clutch K2 and via the activated coupling device H as well as during activated shift element K as a winding path gear. A crawler gear C3 can be shifted via the second clutch K2, via the activated coupling device A, via the activated coupling device C and via the activated coupling device G and the disengaged coupling device S_ab1 as a winding path gear. A crawler gear C4 can be shifted via the second clutch K2, via the activated coupling device A, via the activated coupling device C and via the activated coupling device H and the disengaged coupling device S_ab1 as a winding path gear. A crawler gear C5 can be shifted via the second clutch K2, via the activated coupling device A, via the activated coupling device D and via the activated coupling device H and the disengaged coupling device S_ab1 as a winding path gear.

Figure 3:
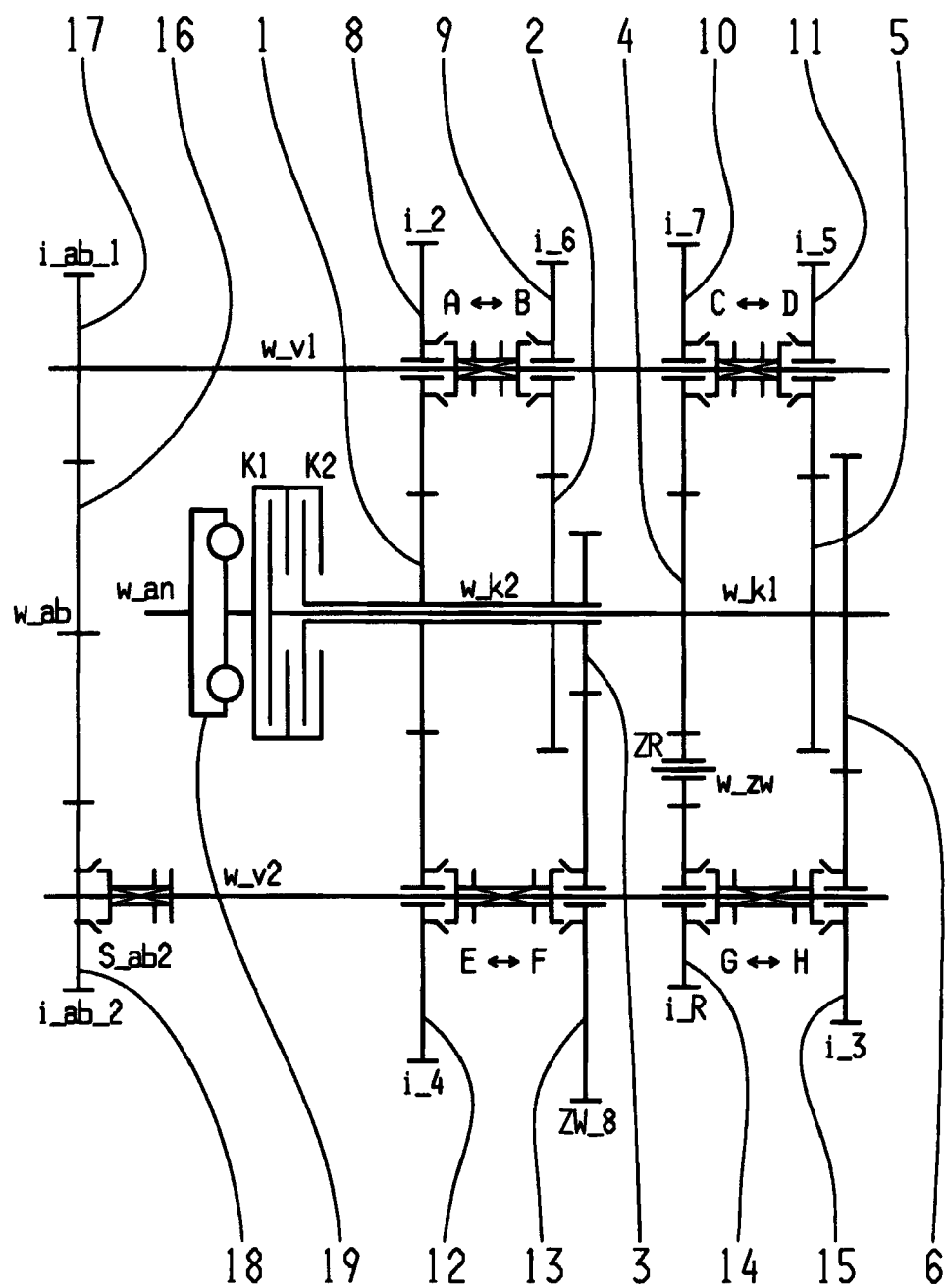
FIG. 3 is a schematic view of a second variant embodiment of the 8-speed double clutch transmission of the invention.

The table represented in FIG. 4 shows for example a shift pattern for the second variant embodiment of the 8-speed double clutch transmissions according to FIG. 3.

The shift pattern shows that the first forward gear G1 can be shifted via the first clutch K1, via the activated coupling device A, via the activated coupling device E and via the activated coupling device H and the disengaged coupling device S_ab2 as a winding path gear, that the second forward gear G2 can be shifted via the second clutch K2 and via the activated coupling device A, that the third forward gear G3 can be shifted via the first clutch K1 and via the activated coupling device H, that the fourth forward gear G4 can be shifted via the second clutch K2 and via the activated coupling device E, that the fifth forward gear G5 can be shifted via the first clutch K1 and via the activated coupling device D, that the sixth forward gear G6 can be shifted via the second clutch K2 and via the activated coupling device B, that the seventh forward gear G7 can be shifted via the first clutch K1 and via the activated coupling device C, and that the eighth forward gear G8 can be shifted via the second clutch K2, via the activated coupling device C, via the activated coupling device F and via the activated coupling device H and the disengaged coupling device S_ab2 as a winding path gear. Thus, at least the first eight forward gears can be power shifted (lsb.).

In addition a reverse gear R1 can be shifted via the second clutch K2 and via the activated coupling device C as well as via the activated shift element K as a winding path gear. A reverse gear R2 can be shifted via the second clutch K2, via the activated coupling device D and during activated shift element K as a winding path gear. A reverse gear R3 can be shifted via the second clutch K2 and via the activated coupling device H as well as during activated shift element K as a winding path gear. Moreover, a reverse gear R4 can be shifted via the second clutch K2, via the activated coupling device C, via the activated coupling device E and via the activated coupling device G and the disengaged coupling device S_ab2 as a winding path gear. Moreover, a reverse gear R5 can be shifted via the second clutch K2, via the activated coupling device D, via the activated coupling device E and via the activated coupling device G and the disengaged coupling device S_ab2 as a winding path gear. A reverse gear R6 can be shifted via the second clutch K2, via the activated coupling device C, via the activated coupling device F and via the activated coupling device G and the disengaged coupling device S_ab2 as a winding path gear. A reverse gear R7 can be shifted via the second clutch K2, via the activated coupling device D, via the activated coupling device F and via the activated coupling device G and the disengaged coupling device S_ab2 as a winding path gear.

Moreover, a crawler gear C1 can be shifted via the second clutch K2, via the activated coupling device A, via the activated coupling device C and via the activated coupling device H and the disengaged coupling device S_ab1 as a winding path gear. A crawler gear C2 can be shifted via the second clutch K2, via the activated coupling device A, via the activated coupling device D and via the activated coupling device H and the disengaged coupling device S_ab1 as a winding path gear.

Finally, an overdrive gear O1 can be shifted via the second clutch K2, via the activated coupling device C, via the activated coupling device E and via the activated coupling device H and the disengaged coupling device S_ab2 as a winding path gear. Furthermore, an overdrive gear O2 can be shifted via the first clutch K1, via the activated coupling device A, via the activated coupling device C and via the activated coupling device E and the disengaged coupling device S_ab1 as a winding path gear.

Figure 5:
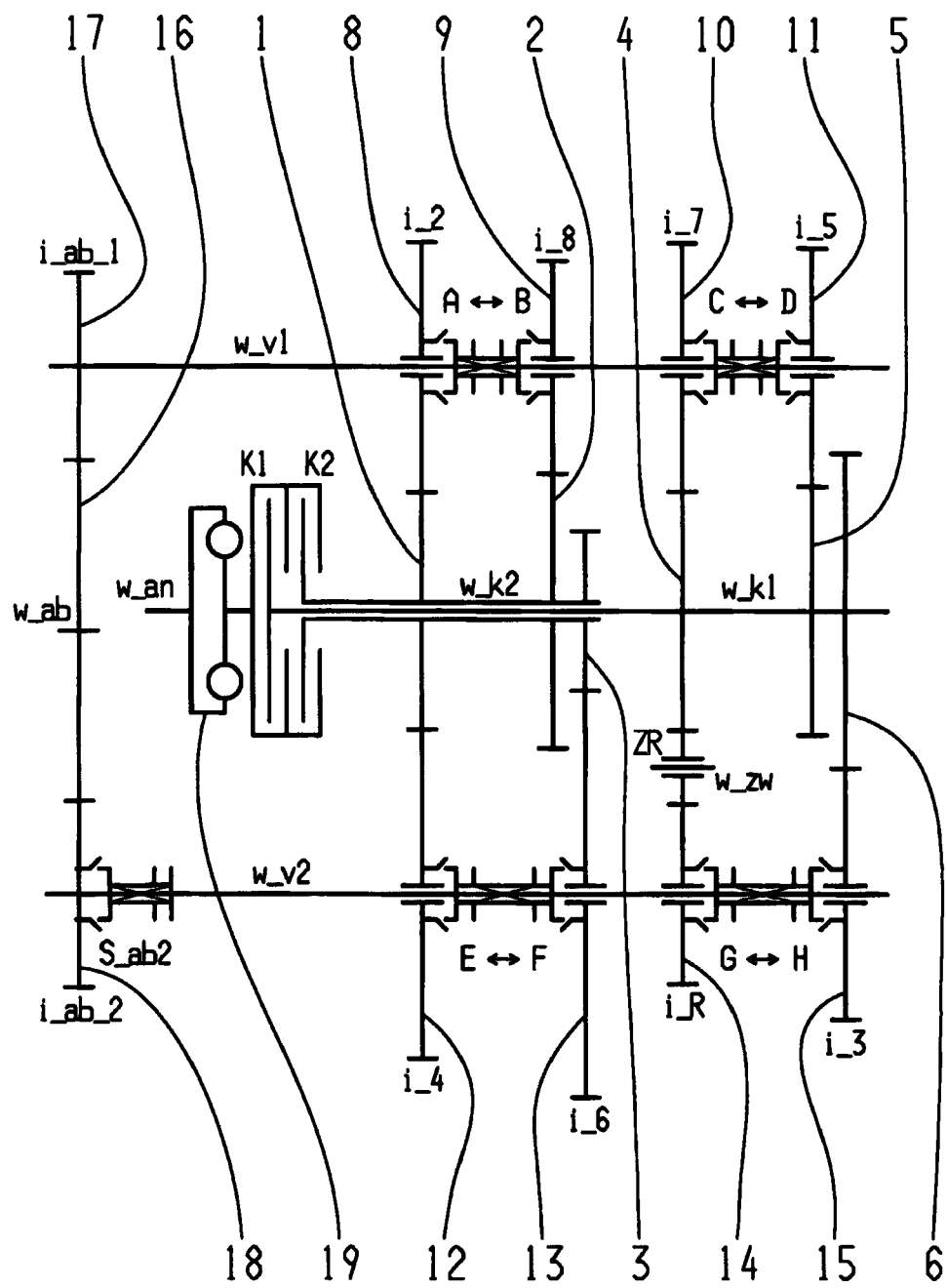
FIG. 5 is a schematic view of a third variant embodiment of the 8-speed double clutch transmission.

The table represented in FIG. 6 shows as example a shift pattern for the third variant embodiment of the 8-speed double clutch transmissions according to FIG. 5.

It follows from the shift pattern that the first forward gear G1 can be shifted via the first clutch K1, via the activated coupling device A, via the activated coupling device E and via the activated coupling device H and the disengaged coupling device S_ab2 as a winding path gear, that the second forward gear G2 can be shifted via the second clutch K2 and via the activated coupling device A, that the third forward gear G3 can shifted via the first clutch K1 and via the activated coupling device H, that the fourth forward gear G4 can be shifted via the second clutch K2 and via the activated coupling device E, that the fifth forward gear G5 can be shifted via the first clutch K1 and via the activated coupling device D, that the sixth forward gear G6 can be shifted via the second clutch K2 and via the activated coupling device F, that the seventh forward gear G7 can be shifted via the first clutch K1 and via the activated coupling device C, and that the eighth forward gear G8 can be shifted via the second clutch K2 and via the activated coupling device B. Thus, at least the first eight forward gears can be power shifted (lsb.).

Moreover, for example, a reverse gear R1 can be shifted via the second clutch K2 and via the activated coupling device D as well as via the activated shift element K as a winding path gear. A reverse gear R2 can be shifted via the second clutch K2, via the activated coupling device H and during activated shift element K as a winding path gear. A reverse gear R3 can be sifted via the second clutch K2, via the activated coupling device C, via the activated coupling device E and via the activated coupling device G and the disengaged coupling device S_ab2 as a winding path gear. Furthermore, a reverse gear R4 can be shifted via the second clutch K2, via the activated coupling device D, via the activated coupling device E and via the activated coupling device G and the disengaged coupling device S_ab2 as a winding path gear. Furthermore, a reverse gear R5 can be shifted via the second clutch K2, via the activated coupling device E, via the activated coupling device F and via the activated coupling device G and the disengaged coupling device S_ab2 as a winding path gear.

Moreover, a crawler gear C1 can be shifted via the second clutch K2, via the activated coupling device A, via the activated coupling device C and via the activated coupling device H and the disengaged coupling device S_ab1 as a winding path gear. A crawler gear C2 can be shifted via the second clutch K2, via the activated coupling device A, via the activated coupling device D and via the activated coupling device H and the disengaged coupling device S_ab1 as a winding path gear. A crawler gear C3 can be shifted via the first clutch K1, via the activated coupling device A, via the activated coupling device F and via the activated coupling device H and the disengaged coupling device S_ab2 as a winding path gear.

Finally, an overdrive gear O1 can be shifted via the second clutch K2, via the activated coupling device C, via the activated coupling device E and via the activated coupling device H and the disengaged coupling device S_ab2 as a winding path gear. An overdrive gear O2 can be shifted via the second clutch K2, via the activated coupling device C, via the activated coupling device F and via the activated coupling device H and the disengaged coupling device S_ab2 as a winding path gear. An overdrive gear O3 can be shifted via the second clutch K2, via the activated coupling device D, via the activated coupling device F and via the activated coupling device H and the disengaged coupling device S_ab2 as a winding path gear. Furthermore, an overdrive gear O4 can be shifted via the first clutch K1, via the activated coupling device A, via the activated coupling device C and via the activated coupling device E and the disengaged coupling device S_ab1 as a winding path gear. An overdrive gear O5 can be shifted via the first clutch K1, via the activated coupling device A, via the activated coupling device C and via the activated coupling device F and disengaging the coupling device S_ab1 as a winding path gear. An overdrive gear O6 can be shifted via the first clutch K1, via the activated coupling device A, via the activated coupling device D and via the activated coupling device F and the disengaged coupling device S_ab1 as a winding path gear.

The table represented in FIG. 8 shows an example of a shift pattern for the 4$^{th}$ variant embodiment of the 8-speed double clutch transmissions according to FIG. 7.

It follows from the shift pattern that the first forward gear G1 can be shifted via the first clutch K1, via the activated coupling device A, via the activated coupling device C and via the activated coupling device E and the disengaged coupling device S_ab1 as a winding path gear, that the second forward gear G2 can be shifted via the second clutch K2 and via the activated coupling device E, that the third forward gear G3 can be shifted via the first clutch K1 and via the activated coupling device C, that the fourth forward gear G4 can be shifted via the second clutch K2 and via the activated coupling device A, that the fifth forward gear G5 can be shifted via the first clutch K1 and via the activated coupling device G, that the sixth forward gear G6 can be shifted via the second clutch K2 and via the activated coupling device B, that the seventh forward gear G7 can be shifted via the first clutch K1 and via the activated coupling device H, and that the eighth forward gear G8 can be shifted via the second clutch K2 and via the activated coupling device H as well as during activated shift element K as a winding path gear. Thus, at least the first eight forward gears can be made power shiftable (lsb.).

Moreover, for example a reverse gear R1 can be shifted via the second clutch K2, via the activated coupling device A, via the activated coupling device D and via the activated coupling device G and disengaging the coupling device S_ab1 as a winding path gear. A reverse gear R2 can be shifted via the second clutch K2, via the activated coupling device A, via the activated coupling device D and via the activated coupling device H and the disengaged coupling device S_ab1 as a winding path gear. A reverse gear R3 can be shifted via the second clutch K2, via the activated coupling device B, via the activated coupling device D and via the activated coupling device G and the disengaged coupling device S_ab1 as a winding path gear.

Moreover, a crawler gear C1 can be shifted via the second clutch K2, via the activated coupling device C, via the activated coupling device E and via the activated coupling device G and the disengaged coupling device S_ab2 as a winding path gear. A crawler gear C2 can be shifted via the second clutch K2, via the activated coupling device C, via the activated coupling device E and via the activated coupling device H and the disengaged coupling device S_ab2 as a winding path gear. A crawler gear C3 can be shifted via the first clutch K1 and via the activated coupling device E as well as during activated shift element I as a winding path gear. A crawler gear C4 can be shifted via the first clutch K1, via the activated coupling device B, via the activated coupling device C and via the activated coupling device E and the disengaged coupling device S_ab1 as a winding path gear.

Finally, an overdrive gear O1 can be shifted via the second clutch K2 and via the activated coupling device G as well as during activated shift element I as a winding path gear. An overdrive gear O2 can be shifted via the second clutch K2 and via the activated coupling device H as well as during activated shift element I as a winding path gear. An overdrive gear O3 can be shifted via the second clutch K2, via the activated coupling device A, via the activated coupling device C and via the activated coupling device H and disengaging the coupling device S_ab1 as a winding path gear. Furthermore, an overdrive gear O4 can be shifted via the first clutch K1, via the activated coupling device B, via the activated coupling device E and via the activated coupling device G and the disengaged coupling device S_ab2 as a winding path gear. An overdrive gear O5 can be shifted via the first clutch K1, via the activated coupling device A, via the activated coupling device E and via the activated coupling device H and the disengaged coupling device S_ab2 as a winding path gear. An overdrive gear O6 can be shifted via the first clutch K1, via the activated coupling device B, via the activated coupling device E and via the activated coupling device H and the disengaged coupling device S_ab2 as a winding path gear. An overdrive gear O7 can be shifted via the second clutch K2, via the activated coupling device B, via the activated coupling device C and via the activated coupling device G and the disengaged coupling device S_ab1 as a winding path gear. An overdrive gear O8 can be via the second clutch K2, via the activated coupling device B, via the activated coupling device C and via the activated coupling device H and the disengaged coupling device S_ab1 as a winding path gear.

The table represented in FIG. 10 shows an example of a shift pattern for the fifth variant embodiment of the 8-speed double clutch transmissions according to FIG. 9.

It follows from the shift pattern that the first forward gear G1 can be shifted via the first clutch K1, via the activated coupling device B, via the activated coupling device D and via the activated coupling device F and via the disengaged coupling device S_ab1 as a winding path gear, that the second forward gear G2 can be shifted via the second clutch K2 and via the activated coupling device F, that the third forward gear G3 can be shifted via the first clutch K1 and via the activated coupling device D, that the fourth forward gear G4 can be shifted via the second clutch K2 and via the activated coupling device B, that the fifth forward gear G5 can be shifted via the first clutch K1 and via the activated coupling device G, that the sixth forward gear G6 can be shifted via the second clutch K2 and via the activated coupling device E, that the seventh forward gear G7 can be shifted via the first clutch K1 and via the activated coupling device C, and that the eighth forward gear G8 can be shifted via the second clutch K2 and via the activated coupling device A. Thus at least the first eight forward gears can be made power shiftable (lsb.).

In addition thereto, for example a reverse gear R1 can be shifted via the second clutch K2 and via the activated coupling device H as well as during activated shift element I as a winding path gear. A reverse gear R2 can be shifted via the second clutch K2 and via the activated coupling device H as well as during activated shift element K as a winding path gear. A reverse gear R3 can be shifted via the first clutch K1, via the activated coupling device B, via the activated coupling device E and via the activated coupling device H and the disengaged coupling device S_ab2 as a winding path gear. A reverse gear R4 can be shifted via the second clutch K2, via the activated coupling device B, via the activated coupling device C and via the activated coupling device H and the disengaged coupling device S_ab1 as a winding path gear.

In addition thereto, a crawler gear C1 can be shifted via the second clutch K2 and via the activated coupling device D as well as during activated shift element I as a winding path gear. A crawler gear C2 can be shifted via the second clutch K2 and via the activated coupling device D as well as during activated shift element K as a winding path gear. A crawler gear C3 can be shifted via the first clutch K1, via the activated coupling device A, via the activated coupling device D and via the activated coupling device F and the disengaged coupling device S_ab1 as a winding path gear.

Finally, an overdrive gear O1 can be shifted via the second clutch K2, via the activated coupling device A, via the activated coupling device D and via the activated coupling device G and the disengaged coupling device S_ab1 as a winding path gear. An overdrive gear O2 can be shifted via the first clutch K1 and via the activated coupling device A as well as during activated shift element I as a winding path gear. An overdrive gear O3 can be shifted via the first clutch K1 and via the activated coupling device E as well as during activated shift element I as a winding path gear. An overdrive gear O4 can be shifted via the first clutch K1 and via the activated coupling device A as well as during activated shift element K as a winding path gear. An overdrive gear O5 can be shifted via the first clutch K1 and via the activated coupling device E as well as during activated shift element K as a winding path gear. An overdrive gear O6 can be shifted via the first clutch K1, via the activated coupling device B, via the activated coupling device C and via the activated coupling device E and the disengaged coupling device S_ab1 as a winding path gear. Advantageously, the overdrive gears O2 and O4 can be made power shiftable particularly toward the eighth forward gear G8.

Figure 11:
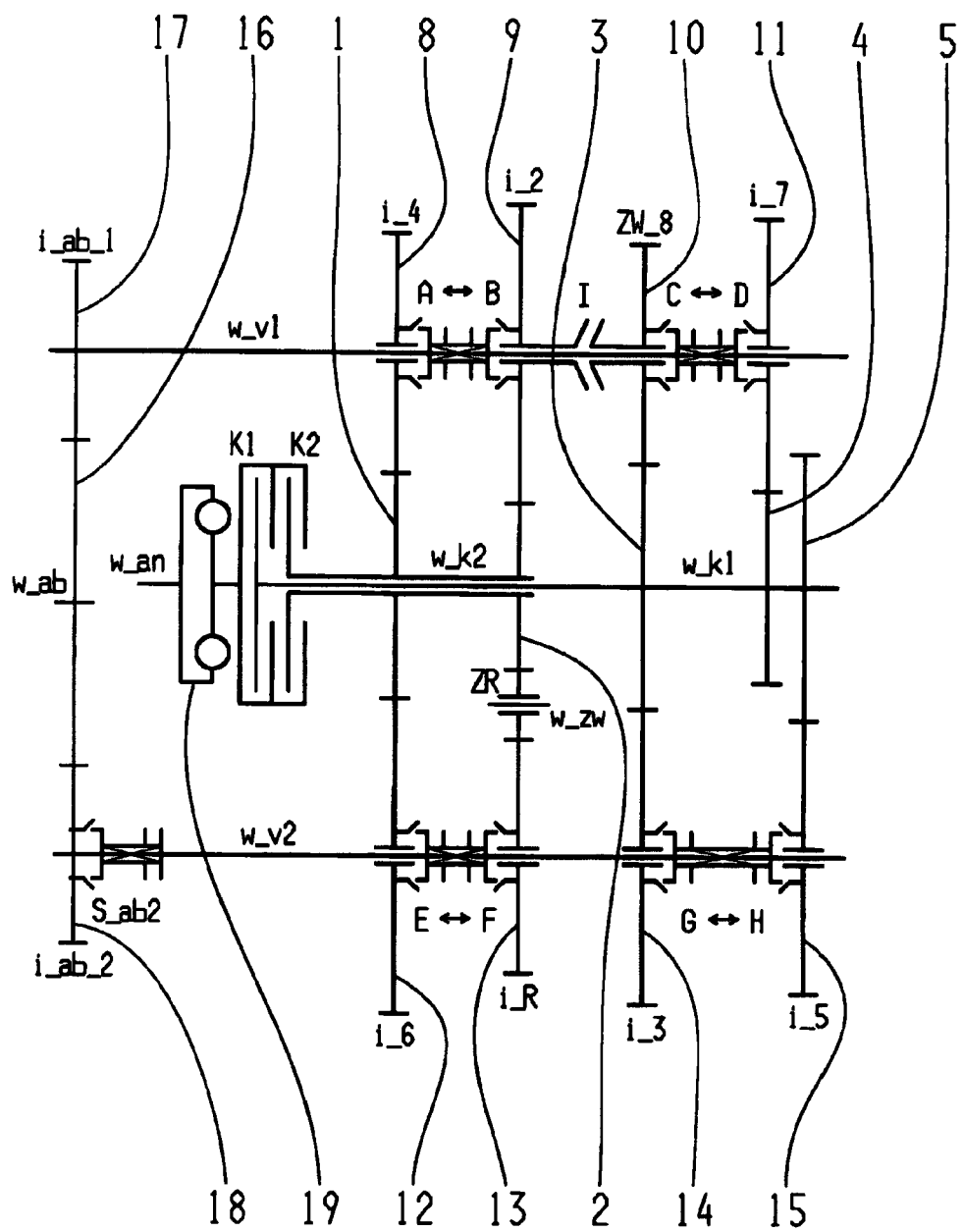
FIG. 11 is a schematic view of a sixth variant embodiment of the 8-speed double clutch transmission of the invention.

The table represented in FIG. 12 shows an example of a shift pattern for the sixth variant embodiment of the 8-speed double clutch transmissions according to FIG. 11.

it follows from the shift pattern that the first forward gear G1 is shiftable via the first clutch K1, via the activated coupling device B, via the activated coupling device E and via the activated coupling device H and via the disengaged coupling device S_ab2 as a winding path gear, that the second forward gear G2 is shiftable via the second clutch K2 and via the activated coupling device B, that the third forward gear G3 is shiftable via the first clutch K1 and via the activated coupling device G, that the fourth forward gear G4 is shiftable via the second clutch K2 and via the activated coupling device A, that the fifth forward gear G5 is shiftable via the first clutch K1 and via the activated coupling device H, that the sixth forward gear G6 is shiftable via the second clutch K2 and via the activated coupling device E, that the seventh forward gear G7 is shiftable via the first clutch K1 and via the activated coupling device D, and that the eighth forward gear G8 is shiftable via the second clutch K2 and via the activated coupling device D as well as during activated shift element I as a winding path gear. Thus, at least the first eight forward gears are power shiftabler (lsb.).

In addition thereto, for example, a reverse gear R1 can be shifted via the second clutch K2, via the activated coupling device C, via the activated coupling device F and via the activated coupling device H and the disengaged coupling device S_ab2 as a winding path gear. A reverse gear R2 can be shifted via the first clutch K1 and via the activated coupling device B as well as via the activated shift element K as a winding path gear. A reverse gear R3 can be shifted via the first clutch K1, via the activated coupling device A, via the activated coupling device C and via the activated coupling device F and via the disengaged coupling device S_ab1 as a winding path gear. A reverse gear R4 can be shifted via the first clutch K1, via activated coupling device B, via the activated coupling device F and via the activated coupling device G and via the disengaged coupling device S_ab2 as a winding path gear.

In addition thereto, a crawler gear C1 can be shifted via the second clutch K2, via the activated coupling device A, via the activated coupling device D and via the activated coupling device G and the disengaged coupling device S_ab1 as a winding path gear. A crawler gear C2 can be shifted via the second clutch K2, via the activated coupling device B, via the activated coupling device D and via the activated coupling device G and the disengaged coupling device S_ab1 as a winding path gear. A crawler gear C3 can be shifted via the second clutch K2, via the activated coupling device B, via the activated coupling device D and via the activated coupling device H and the disengaged coupling device S_ab1 as a winding path gear. A crawler gear C4 can be shifted via the first clutch K1, via the activated coupling device B, via the activated coupling device E and via the activated coupling device G and the disengaged coupling device S_ab2 as a winding path gear.

Finally, an overdrive gear O1 is shiftable via the second clutch K2, via the activated coupling device D, via the activated coupling device E and via the activated coupling device G and the disengaged coupling device S_ab2 as a winding path gear. An overdrive gear O2 is shiftable via the second clutch K2, via the activated coupling device D, via the activated coupling device E and via the activated coupling device H and the disengaged coupling device S_ab2 as a winding path gear. An overdrive gear O3 is shiftable via the first clutch K1, via the activated coupling device A, via the activated coupling device D and via the activated coupling device E and the disengaged coupling device S_ab1 as a winding path gear. Moreover, an overdrive gear O4 is shiftable via the first clutch K1, via the activated coupling device B, via the activated coupling device D and via the activated coupling device E and the disengaged coupling device S_ab1 as a winding path gear.

The table represented in FIG. 14 shows for example a shift pattern for the seventh variant embodiment of the 8-speed double clutch transmissions according to FIG. 13.

It follows from the shift pattern that the first forward gear G1 can be shifted via the first clutch K1 and via the activated coupling device B as well as via the activated shift element K, that the second forward gear G2 can be shifted via the second clutch K2 and via the activated coupling device B, that the third forward gear G3 can be shifted via the first clutch K1 and via the activated coupling device G, that the fourth forward gear G4 can be shifted via the second clutch K2 and via the activated coupling device F, that the fifth forward gear G5 can be shifted via the first clutch K1 and via the activated coupling device D, that the sixth forward gear G6 can be shifted via the second clutch K2 and via the activated coupling device E, that the seventh forward gear G7 can be shifted via the first clutch K1 and via the activated coupling device H, and that the eighth forward gear G8 can be shifted via the second clutch K2 and via the activated coupling device H as well as during activated shift element I as a winding path gear. Thus, at least the first eight forward gears can be power shiftable (lsb.).

In addition thereto, for example, a reverse gear RI can be shifted via the first clutch K1, via the activated coupling device A, via the activated coupling device C and via the activated coupling device F and the disengaged coupling device S_ab1 as a winding path gear. A reverse gear R2 can be shifted via the first clutch K1, via the activated coupling device A, via the activated coupling device E and via the activated coupling device G and via the disengaged coupling device S_ab2 as a winding path gear.

In addition thereto, a crawler gear C1 can be shifted via the second clutch K2, via the activated coupling device B, via the activated coupling device D and via the activated coupling device G and the disengaged coupling device S_ab1 as a winding path gear. A crawler gear C2 can be shifted via the first clutch K1, via the activated coupling device B, via the activated coupling device E and via the activated coupling device G and the disengaged coupling device S_ab2 as a winding path gear.

Finally, an overdrive gear O1 is shiftable via the second clutch K2 and via the activated coupling device H as well as during activated shift element K as a winding path gear. An overdrive gear O2 is shiftable via the second clutch K2, via the activated coupling device D, via the activated coupling device E and via the activated coupling device G and the disengaged coupling device S_ab2 as a winding path gear. An overdrive gear O3 is shiftable via the first clutch K1, via the activated coupling device B, via the activated coupling device D and via the activated coupling device E and the disengaged coupling device S_ab1 as a winding path gear.

It follows from the shift pattern of the first variant embodiment according to the FIGS. 1 and 2 in particular that in the first forward gear G1 starting with the first clutch K1, gear stage i_1 will be used, in the second forward gear G2, gear stage i_2 will be used, in the third forward gear G3, gear stage i_3 will be used, in the fourth forward gear G4, gear stage i_4 will be used, in the fifth forward gear G5, gear stage i_5 will be used, in the sixth forward gear G6, gear stage i_6 will be used, in the seventh forward gear G7, gear stage i_7 will be used and in the eighth forward gear G8 starting from the second clutch K2, gear stages i_2, i_1 and i_7 will be used, while the two subtransmissions will be coupled with one another by disengagement of the coupling device S_ab2.

It also follows from the shift pattern of the first variant embodiment, that in the reverse gear R1 starting from the second clutch K2, gear stage i_R will be used. Moreover, in the additional reverse gears R2 starting from the first clutch K1, gear stages i_3, i_2 and i_R will be used, while for the coupling of the two subtransmissions shift element K will be activated. In the reverse gear R3 starting from the first clutch K1, gear stages i_5, i_4 and i_R will be used, while the two subtransmissions will be coupled with one another by disengagement of the coupling device S_ab1. In the reverse gear R4 starting from the first clutch K1, gear stages i_5, i_6 and i_R will be used, while the two subtransmissions will be coupled with one another by disengagement of the during opened coupling device S_ab1.

In the crawler gear C1 starting from the second clutch K2, gear stages i_6, i_7 and i_1 will be used, while the two subtransmissions will be coupled during activated shift element I with one another. In the crawler gear C2 starting from the second clutch K2, gear stages i_2, i_3 and i_1 will be used, while the two subtransmissions will be coupled during activated shift element K with one another. In the crawler gear C3 starting from the second clutch K2, gear stages i_4, i_7 and i_3 will be used, while the two subtransmissions will be coupled with one another by disengagement of the coupling device S_ab1. In the crawler gear C4 starting from the second clutch K2, gear stages i_4, i_7 and i_1 will be used, while the two subtransmissions will be coupled with one another by disengagement of the coupling device S_ab1. In the crawler gear C5 starting from the second clutch K2, gear stages i_4, i_5 and i_1 will be used, while the two subtransmissions will be coupled with one another by disengagement of the coupling device S_ab1.

It follows in the second variant embodiment according to FIG. 4 that in the first forward gear O1 starting from the first clutch K1, gear stages i_3, i_4 and i_2 will be used, while the two subtransmissions will be coupled with one another by disengagement of the coupling device S_ab2. In the second forward gear G2, the gear stage i_2 will be used, in the third forward gear G3, gear stage i_3 will be used, in the fourth forward gear G4, gear stage i_4 will be used, in the fifth forward gear G5, gear stage i_5 will be used, in the sixth forward gear G6, gear stage i_6 will be used, in the seventh forward gear G7, gear stage i_7 will be used and in the eighth forward gear G8 starting from the second clutch K2, gear stages ZW_8, i_3 and i_7 will be used, while the two subtransmissions will be coupled with one another by disengagement of the coupling device S_ab2.

In the reverse gear R1 starting from the second clutch K2, gear stages ZW_8, i_R and i_7 will be used, while the two subtransmissions will be coupled via the activated shift element K with one another. In the reverse gear R2 starting with the second clutch K2, gear stages ZW_8, i_R and i_5 will be used, while for the coupling of the two subtransmissions, shift element K will be activated. In the reverse gear R3 starting from the second clutch K2, gear stages ZW_8, i_R and i_3 will be used, while for the coupling of the two subtransmissions, shift element K will be activated. In the reverse gear R4 starting with the second clutch K2, gear stages i_4, i_R and i_7 will be used, while the two subtransmissions will be coupled with one another by disengagement of the coupling device S_ab2. In the reverse gear R5 starting with the second clutch K2, gear stages i_4, i_R and i_5 will be used, while the two subtransmissions will be coupled with one another by disengagement of the coupling device S_ab2. In the reverse gear R6 starting with the second clutch K2, gear stages ZW_8, i_R and i_7 will be used, while the two subtransmissions will be coupled with one another by disengagement of the coupling device S_ab2. In the reverse gear R7 starting with the second clutch K2, gear stages ZW_8, i_R and i_5 will be used, while the two subtransmissions will be coupled with one another by disengagement of the coupling device S_ab2.

In the crawler gear C1 starting from the second clutch K2, gear stages i_2, i_7 and i_3 will be used, while the two subtransmissions are coupled with one another by disengagement of the coupling device S_ab1. In the crawler gear C2 starting from the second clutch K2, gear stages i_2, i_5 and i_3 are being used, while the two subtransmissions are coupled with one another by disengagement of the coupling device S_ab1.

In the overdrive gear O1 starting with the second clutch K2, gear stages i_4, i_3 and i_7 will be used, while the two subtransmissions are coupled with one another by disengagement of the coupling device S_. In overdrive gear O2 starting with the first clutch K1, gear stages i_7, i_2 and i_4 will be used, while the two subtransmissions are coupled with one another by disengagement of the coupling device S_ab1.

It follows from the shift pattern of the third variant embodiment according to the FIGS. 5 and 6 that in the first forward gear G1 starting from the first clutch K1, gear stages i_3, i_4 and i_2 will be used, while the two subtransmissions are coupled with one another by disengagement of the coupling device S_ab2. In the second forward gear G2, gear stage i_2 will be used, in the third forward gear G3, gear stage i_3 will be used, in the fourth forward gear G4, gear stage i_4 will be used, in the fifth forward gear G5, gear stage i_5 will be used, in the sixth forward gear G6, gear stage i_6 will be used, in the seventh forward gear G7, gear stage i_7 will be used and in the eighth forward gear G8 starting from the second clutch K2, gear stage i_8 will be used.

In the reverse gear R1 starting from the second clutch K2, gear stages i_6, i_R and i_5 will be used, while the two subtransmissions will be coupled via the activated shift element K with one another. In reverse gear R2 starting from the second clutch K2, gear stages i_6, i_R and i_3 will be used, while for the coupling of the two subtransmissions shift element K will be activated. In reverse gear R3 starting from the second clutch K2, gear stages i_4, i_R and i_7 will be used, while for the coupling of the two subtransmissions, the coupling device S_ab2 will be disengaged. In reverse gear R4 starting from the second clutch K2, gear stages i_4, i_R and i_5 will be used, while the two subtransmissions will be coupled with one another by disengagement of the coupling device S_ab2. In the reverse gear R5 starting from the second clutch K2, gear stages i_6, i_R and i_5 will be used, while the two subtransmissions will be coupled with one another by disengagement of the coupling device S_ab2.

In the crawler gear C1 starting from the second clutch K2, gear stages i_2, i_7 and i_3 will be used, while the two subtransmissions will be coupled with one another by disengagement of the coupling device S_ab1. In the crawler gear C2 starting from the second clutch K2, gear stages i_2, i_5 and i_3 will be used, while the two subtransmissions will be coupled with one another by disengagement of the coupling device S_ab1. In the crawler gear C3, starting from the first clutch K1, gear stages i_3, i_6 and i_2 will be used, while the two subtransmissions will be coupled with one another by disengagement of the coupling device S_ab2.

In overdrive gear O1, starting from the second clutch K2, gear stages i_4, i_3 and i_7 will be used, while the two subtransmissions will be coupled during opened coupling device S_ab2. In overdrive gear O2 starting from the second clutch K2 die gear stages i_6, i_3 and i_7 will be used, while the two subtransmissions will be coupled with one another by disengagement of the coupling device S_ab2. In overdrive gear O3, starting from the second clutch K2, gear stages i_6, i_3 and i_5 will be used, while the two subtransmissions will be coupled with one another by disengagement of the coupling device S_ab2. In overdrive gear O4, starting from the first clutch K1, gear stages i_7, i_2 and i_4 will be used, while the two subtransmissions will be coupled with one another by disengagement of the coupling device S_ab1. In overdrive gear O5, starting from the first clutch K1, gear stages i_7, i_2 and i_6 will be used, while the two subtransmissions will be coupled with one another by disengagement of the coupling device S_ab1. In overdrive gear O6, starting from the first clutch K1, gear stages i_5, i_2 and i_6 will be used, while the two subtransmissions will coupled with one another by disengagement of the coupling device S_ab1.

It follows from the shift patterns of the fourth variant embodiment according to the FIGS. 7 and 8 that in the first forward gear G1, starting from the first clutch K1, gear stages i_3, i_4 and i_2 will be used, while the two subtransmissions will be coupled with one another by disengagement of the coupling device S_ab1. In the second forward gear G2, gear stage i_2 will be used, in the third forward gear G3, gear stage i_3 will be used, in the fourth forward gear G4, gear stage i_4 will be used, in the fifth forward gear G5, gear stage i_5 will be used, in the sixth forward gear G6, gear stage i_6 will be used, in the seventh forward gear G7, gear stage i_7 will be used and in the eighth forward gear G8, starting from the second clutch K2, gear stages ZW_8, i_5 and i_7 will be used, while the two subtransmissions will be coupled with one another via the activated shift element K.

In the reverse gear R1, starting from the second clutch K2, gear stages i_4, I_R and i_5 will be used, while the two subtransmissions will be coupled with one another by disengagement of the coupling device S_ab1. In the reverse gear R2, starting from the second clutch K2, gear stages i_4, i_R and i_7 will be used, while for the coupling of the two subtransmissions the coupling device S_ab1 will be disengaged. In the reverse gear R3 starting from the second clutch K2, gear stages i_6, i_R and i_5 will be used, while for the coupling of the two subtransmissions, the coupling device S_ab1 will be disengaged.

In the crawler gear C1, starting from the second clutch K2, gear stages i_2, i_5 and i_3 will be used, while the two subtransmissions will be coupled with one another by disengagement of the coupling device S_ab2. In the crawler gear C2, starting from the second clutch K2, gear stages i_2, i_7 and i_3 will be used, while the two subtransmissions will be coupled with one another by disengagement of the coupling device S_ab2. In the crawler gear C3 starting from the first clutch K1, gear stages i_3, i_6 and i_2 will be used, while the two subtransmissions will be coupled with one another during activated shift element I. In the crawler gear C4, starting from the first clutch K1, the gear stages i_3, i_6 and i_2 will be used, while the two subtransmissions will be coupled with one another by disengagement of the coupling device S_ab1.

In the overdrive gear O1, starting from the second clutch K2, gear stages i_6, i_3 and i_5 will be used, while the two subtransmissions will be coupled during activated shift element I. In the overdrive gear O2, starting from the second clutch K2, gear stages i_6, i_3 and i_7 will be used, while the two subtransmissions will be coupled during activated shift element I. In the overdrive gear O3, starting from the second clutch K2, the gear stages i_4, i_3 and i_7 will be used, while the two subtransmissions will be coupled with one another by disengagement of the coupling device S_ab1. In the overdrive gear O4, starting from the first clutch K1, gear stages i_5, i_2 and i_6 will be used, while the two subtransmissions will be coupled with one another by disengagement of the coupling device S_ab2. In the overdrive gear O5, starting from the first clutch K1, gear stages i_7, i_2 and i_4 will be used, while the two subtransmissions will be coupled with one another by disengagement of the coupling device S_ab2. In the overdrive gear O6, starting from the first clutch K1, gear stages i_7, i_2 and i_6 will be used, while the two subtransmissions will be coupled with one another by disengagement of the coupling device S_ab2. In the overdrive gear O7, starting from the second clutch K2, gear stages i_6, i_3 and i_5 will be used, while the two subtransmissions will be coupled with one another by disengagement of the coupling device S_ab1. In the overdrive gear O8, starting from the second clutch K2, gear stages i_6, i_3 and i_7 will be used, while the two subtransmissions will be coupled with one another by disengagement of the coupling device S_ab1.

It follows from the shift pattern of the fifth variant embodiment according to

FIGS. 9 and 10 that in the first forward gear G1, starting from the first clutch K1, gear stages i_3, i_4 and i_2 will be used, while the two subtransmissions will be coupled with one another by disengagement of the coupling device S_ab1. In the second forward gear G2, gear stage i_2 will be used, in the third forward gear G3, gear stage i_3 will be used, in the fourth forward gear G4, gear stage i_4 will be used, in the fifth forward gear G5, gear stage i_5 will be used, in the sixth forward gear G6, gear stage i_6 will be used, in the seventh forward gear G7, gear stage i_7 and in the eighth forward gear G8, starting from the second clutch K2, gear stage i_8 will be used.

In the reverse gear R1, starting from the second clutch K2, gear stages i_4, i_7 and i_R will be used, while the two subtransmissions will be coupled with one another via the activated shift element I. In the reverse gear R2, starting from the second clutch K2, gear stages i_2, i_5 and i_R will be used, while for the coupling of the two subtransmissions shift element K will be activated. In the reverse gear R3, starting from the first clutch K1, gear stages i_R, i_6 and i_4 will be used, while for the coupling of the two subtransmissions the coupling device S_ab2 will be disengaged. In the reverse gear R4, starting from the second clutch K2, gear stages i_4, i_7 and i_R will be used, while the two subtransmissions will be coupled with one another by disengagement of the coupling device S_ab1.

In the crawler gear C1, starting from the second clutch K2, gear stages i_4, i_7 and i_3 will be used, while the two subtransmissions will be coupled during activated shift element I with one another. In the crawler gear C2, starting from the second clutch K2, gear stages i_2, i_5 and i_3 will be used, while the two subtransmissions will be coupled during activated shift element K with one another. In the crawler gear C3, starting from the first clutch K1, gear stages i_3, i_8 and i_2 will be used, while the two subtransmissions will be coupled with one another by disengagement of the coupling device S_ab1.

In the overdrive gear O1, starting from the second clutch K2, gear stages i_8, i_3 and i_5 will be used, while the two subtransmissions will be coupled with one another by disengagement of the coupling device S_ab1. In the overdrive gear O2, starting from the first clutch K1, gear stages i_7, i_4 and i_8 will be used, while the two subtransmissions will be coupled during activated shift element I. In the overdrive gear O3, starting from the first clutch K1, gear stages i_7, i_4 and i_6 will be used, while the two subtransmissions will be coupled during activated shift element I. In the overdrive gear O4, starting from the first clutch K1, gear stages i_5, i_2 and i_8 will be used, while the two subtransmissions will be coupled during activated shift element. In the overdrive gear O5, starting from the first clutch K1, gear stages i_5, i_2 and i_6 will be used, while the two subtransmissions will be coupled during activated shift element K. In the overdrive gear O6, starting from the first clutch K1, gear stages i_7 i_4 and i_6 will be used, while the two subtransmissions will be coupled during opened coupling device S_ab1.

It follows from the shift pattern of the sixth variant embodiment according to FIGS. 11 and 12 that in the first forward gear G1, starting from the first clutch K1, gear stages i_5, i_6 and i_2 will be used, while the two subtransmissions will be coupled with one another by disengagement of the coupling device S_ab2. In the second forward gear G2, gear stage i_2 will be used, in the third forward gear G3, gear stage i_3 will be used, in the fourth forward gear G4, gear stage i_4 will be used, in the fifth forward gear G5, gear stage i_5 will be used, in the sixth forward gear G6, gear stage i_6 will be used, in the seventh forward gear G7, gear stage i_7 and in the eighth forward gear G8, starting from the second the second clutch K2, gear stages i_2, ZW_8 and i_7 will be used, while the two subtransmissions will be coupled via the activated shift element I with one another.

In the reverse gear R1, starting from the second clutch K2, gear stages i_R, i_5 and ZW_8 will be used, while the two subtransmissions will be coupled with one another by disengagement of the coupling device S_ab2. In the reverse gear R2, starting from the first clutch K1, gear stages i_3, i_R and i_2 will be used, while for the coupling of the two subtransmissions the shift element K will be activated. In the reverse gear R3, starting from the first clutch K1, gear stages ZW_8, i_4 and i_R will be used, while for the coupling of the two subtransmissions the coupling device S_ab1 will be disengaged. In the reverse gear R4, starting from the first clutch K1, gear stages i_3, i_R and i_2 will be used, while the two subtransmissions will be coupled with one another by disengagement of the coupling device S_ab2.

In the crawler gear C1, starting from the second clutch K2, gear stages i_4, i_7 and i_3 will be used, while the two subtransmissions will be coupled with one another by disengagement of the coupling device S_ab1. In the crawler gear C2, starting from the second clutch K2, gear stages i_2, i_7 and i_3 will be used, while the two subtransmissions will be coupled with one another by disengagement of the coupling device S_ab1. In the crawler gear C3, starting from the second clutch K2, gear stages i_2, i_7 and i_5 will be used, while the two subtransmissions will be coupled with one another by disengagement of the coupling device S_ab1 . In the crawler gear C4, starting from the first clutch K1, gear stages i_3, i_6 and i_2 will be used, while the two subtransmissions will be coupled with one another by disengagement of the coupling device S_ab2.

in the overdrive gear O1, starting from the second clutch K2, gear stages i_6, i_3 and i_7 will be used, while the two subtransmissions will coupled with one another by disengagement of the coupling device S_ab2. In the overdrive gear O2, starting from the second clutch K2, gear stages i_6, i_5 and i_7 will be used, while the two subtransmissions will be coupled with one another by disengagement of the coupling device S_ab2. In the overdrive gear O3 starting from the second clutch K2, gear stages i_7, i_4 and i_6 will be used, while the two subtransmissions will be coupled with one another by disengagement of the coupling device S_ab1. In the overdrive gear O4, starting from the first clutch K1, gear stages i_7, i_2 and i_6 will be used, while the two subtransmissions will be coupled with one another by disengagement of the coupling device S_ab1.

It follows from the shift pattern of the seventh variant embodiment according to FIGS. 13 and 14 that in the first forward gear G1, starting from the first clutch K1, gear stages i_3, i_4 and i_2 will be used, while the two subtransmissions will be coupled via the activated shift element K with one another. In the second forward gear G2, gear stage i_2 will be used, in the third forward gear G3, gear stage i_3 will be used, in the fourth forward gear G4, gear stage i_4 will be used, in the fifth forward gear G5, gear stage i_5 will be used, in the sixth forward gear G6, gear stage i_6 will be used, in the seventh forward gear G7, die gear stage i_7 and in the eighth forward gear G8, starting from the second clutch K2, gear stages i_2, ZW_8 and i_7 will be used, while the two subtransmissions will be coupled via the activated shift element I with one another.

In the reverse gear R1, starting from the first clutch K1, gear stages ZW_8, i_R and i_4 will be used, while for the coupling of the two subtransmissions, coupling device S_ab1 will be disengaged. In the reverse gear R2, starting from the first clutch K1, gear stages i_3, i_6 and i_R will be used, while the two subtransmissions will be coupled with one another by disengagement of the coupling device S_ab2.

In the crawler gear C1, starting from the second clutch K2, gear stages i_2, i_5 and i_3 will be used, while the two subtransmissions will be coupled with one another by disengagement of the coupling device S_ab1 with one another. In the crawler gear C2, starting from the first clutch K1, gear stages i_3, i_6 and i_2 will be used, while the two subtransmissions will be coupled with one another by disengagement of the coupling device S_ab2 with one another.

In the overdrive gear O1, starting from the second clutch K2, gear stages i_4, i_3 and i_7 will be used, while the two subtransmissions will be coupled during activated shift element K. In the overdrive gear O2, starting from the second clutch K2, gear stages i_6, i_3 and i_5 will be used, while the two subtransmissions will be coupled with one another by disengagement of the coupling device S_ab2. In the overdrive gear O3, starting from the first clutch K1, gear stages i_5, i_2 and i_6 will be used, while the two subtransmissions will be coupled with one another by disengagement of the coupling device S_ab1.

In summary, it follows from the first, second and third variant embodiment according to FIGS. 1 thru 6 that a winding path gear coupling device S_ab2 allocated to output gear 18 has been allocated.

In the first variant embodiment, an eight forward gear as a winding path gear will be realized via the gear stages of the second, first and seventh gears. Moreover, there are provided three dual gear planes and two single gear planes. The first countershaft will be less loaded through the gear stages of the fourth, fifth, sixth and seventh gears than the second countershaft. This creates advantages with respect to the shaft and bearing dimensioning.

In particular, it follows from the first variant embodiment that on the first gear plane 8-12 designed as a dual gear plane, the idler gear 8 will be used for four forward gears G4, C3, C4, C5 as well as for one reverse gear R3 and idler gear 12 will be used for four reverse gears R1 thru R4. In the second gear plane 9-13 designed as a dual gear plane, the idler gear 9 will be used for two forward gears G6, C1 as well as for one reverse gear R4 and the idler gear 13 will be used for three forward gears G2, G8, C2 as well as for one reverse gear R2.

In the third gear plane 10-14 designed as a dual gear plane, the idler gear 10 will be used for five forward gears G7, G8, C1, C3, C4 and the idler gear 14 will be used for three forward gears G3, C2, C3 as well as for one reverse gear R2. In the fourth gear plane 11-4 designed as a single gear plane, the idler gear 11 will be used for two forward gears G5, C5 as well as for two reverse gears R3, R4. In the fifth gear plane 5-15 designed as a single gear plane, the idler gear 15 will be used for six forward gears G1, G8, C1, C2, C4, C5.

In the second variant embodiment the first forward gear will be realized as a winding path gear via the gear stages of the of the third, fourth and second gear and the eighth forward gear as a winding path gear via the additional gear stage ZW_8, which will not be used for any other gear, as well as via the gear stages of the third and fourth gear. Moreover, there are provided two dual gear planes and four single gear planes. In addition, for fuel savings, an overdrive gear power shiftable to the seventh forward gear will be realized.

In particular, for the second variant embodiment it follows that in the first gear plane 8-12 designed as a dual gear plane, idler gear 8 will be used for five forward gears G1, G2, C1, C2, O2 and idler gear 12 will be used for four forward gears G1, G4, O1, O2 as well as for two reverse gears R4, R5. In the second gear plane 9-2 designed as a single gear plane, idler gear 9 will be used for a forward gear G6. In the third gear plane 3-13 designed as a single gear plane, the idler gear 13 will be used for one forward gear G8 as well as for five reverse gears R1, R2, R3, R6, R7. In the fourth gear plane 10-14 designed as a dual gear plane, the idler gear 10 will be used for five forward gears G7, G8, C1, O1, O2 as well as for three reverse gears R1, R4, R6 and the idler gear 14 will be used for seven reverse gears R1 thru R7. In the fifth gear plane 11-5 designed as a single gear plane, the idler gear 11 will be used for two forward gears G5, C2 as well as for three reverse gears R2, R5, R7. Finally, in the sixth gear plane 6-15 designed as a single gear plane, idler gear 15 will be used for six forward gears G1, G3, G8, C1, C2, O1 as well as for one reverse gear R3.

The third variant embodiment results in a first forward gear as a winding path gear via the gear stages of the third, fourth and second gears. Moreover, two dual gear planes and four single gear planes are provided. Moreover, there will result an additional crawler gear CR, which is power shiftable to the second forward gear, resulting in better driving features off the road. In addition thereto, two additional overdrive gears O1 and O2 power shiftable to the seventh forward are being realized for fuel savings.

In particular, for the third variant embodiment it follows that in the first gear plane 8-12 designed as a dual gear plane, idler gear 8 will be used for eight forward gears G1, G2, C1, C2, C3, O4, O5, O6 and the idler gear 12 will be used for four forward gears G1, G4, O1, O4 as well as for two reverse gears R3, R4. In the second gear plane 9-2 designed as a single gear plane, the idler gear 9 will be used for one forward gear G8. In the third gear plane 3-13 designed as a single gear plane, the idler gear 13 will be used for six forward gears G6, C3, O2, O3, O5, O6 as well as for three reverse gears R1, R2, R5. In the fourth gear plane 10-14 designed as a dual gear plane, the idler gear 10 will be used for six forward gears G7, C1, O1, O2, O4, O5 as well as for one reverse gear R3 and the idler gear 14 will be used for five reverse gears R1, thru R5. In the fifth gear plane 11-5 designed as a single gear plane, the idler gear 11 will be used for four forward gears G5, C2, O3, O6 as well as for three reverse gears R1, R4, R5. Finally, in the sixth gear plane 6-15 designed as a single gear plane, the idler gear 15 will be used for eight forward gears G1, G3, C1, C2, C3, O1, O2, O3.

In the fourth and fifth variant embodiment according to FIGS. 7-10, a winding path gear coupling device S_ab1 allocated to output gear 17 as well as a winding path gear-shift element K allocated to the second countershaft are provided.

In addition, for the fourth variant embodiment there results a first forward gear as a winding path gear, which is realized via the gear stages of the third, fourth and second gears. Moreover, an eighth forward gear as a winding path gear will be used via the additional gear stage ZW_8, which is not used for any other forward gear, as well as via the gear stages of the fifth and seventh gears. In addition thereto, there are provided two dual gear planes and four single gear planes. Moreover, an additional crawler gear C3 or C4 power-shiftable to the second forward gear is enabled, which can realize better driving features off road. In addition, three additional overdrive gears O2, O3 and O7 power shiftable to the seventh forward gear are enabled for fuel savings.

In particular, it follows for the fourth variant embodiment that in the first gear plane 8-12 designed as a dual gear plane, the idler gear 8 will be used for four forward gears G1, G4, O3, O5 as well as for two reverse gears R1, R2 and the idler gear 12 will be used for nine forward gears G1, G2, C1, C2, C3, C4, O4, O5, O6. In the second gear plane 9-2 designed as a single gear plane, the idler gear 9 will be used for nine forward gears G6, C3, C4, O1, O2, O4, O6, O7, O8 as well as for one reverse gear R3. In the third gear plane 3-13 designed as a single gear plane, the idler gear 13 will be used for one forward gear G8. In the fourth gear plane 10-4 designed as a single gear plane, the idler gear 10 will be used for eleven forward gears G1, G3, C1, C2, C3, C4, O1, O2, O3, O7, O8. In the fifth gear plane 5-14 designed as a single gear plane, the idler gear 14 will be used for six forward gears G5, G8, C1, O1, O4, O7 as well as for two reverse gears R1, R3. Finally, in the sixth gear plane 11-15 designed as a dual gear plane, the idler gear 11 will be used for three reverse gears R1 thru R3 and the idler gear 15 will be used for eight forward gears G7, G8, C2, O2, O3, O5, O6, O8 as well as for one reverse gear R2.

In the fifth variant embodiment, a first forward gear will be realized as a winding path gear via the gear stages of the third, fourth and second gears. Moreover, three dual gear plane and two single gear planes are provided. In addition thereto, an additional crawler gear C3 power shiftable to the second forward gear can be realized for better driving features off road. Additionally, an additional overdrive gear O4 power shiftable to the eighth forward gear as possible ninth forward gear for fuel savings is feasible.

In particular, it follows for the fifth variant embodiment that in the first gear plane 8-12 designed as a dual gear plane, the idler gear 8 will be used for five forward gears G8, C3, O1, O2, O4 and the idler gear 12 will be used for four forward gears G6, O3, O5, O6 as well as for one reverse gear R3. In the second gear plane 92 designed as a single gear plane, the idler gear 9 will be used for six forward gears G1, G4, C1, O2, O3, O6 as well as for three reverse gears R1, R3, R4. In the third gear plane 3-13 designed as a single gear plane, the idler gear 13 will be used for six forward gears G1, G2, C2, C3, O4, O5 as well as for one reverse gear R2. In the fourth gear plane 10-14 designed as a dual gear plane, the idler gear 10 will be used for five forward gears G7, C1, O2, O3, O6 as well as for two reverse gears R1, R4 and the idler gear 14 will be used for five forward gears G5, C2, O1, O4, O5 as well as for one reverse gear R2. In the fifth gear plane 11-15 designed as a dual gear plane, the idler gear 11 for six forward gears G1, G3, C1, C2, C3, O1 and the idler gear 15 will be used for four reverse gears R1 thru R4.

In the sixth variant embodiment according to FIGS. 11 and 12, a winding path gear coupling device S_ab2 allocated to the output gear 18 and a winding path gear-shift element I allocated to the first countershaft are provided. Moreover, a first forward gear is implemented as a widing path gear by way of the gear stages of the fifth, sixth and second gears and an eighth forward gear is implemented as a winding path gear by way of the gear stages of the second gears, to realize the additional gear stage and the gear stages of the gears. Additionally, three dual gear planes and two single gear planes are provided. A reverse gear R4 power shifted to the second forward gear can be made possible, to realize rocking free. With an additional crawler gear C power shiftable to the second forward gear, better driving features off road will be realized. Fuel savings can be realized via two additional overdrive gears O3 and O4 power shiftable to the eighth forward gear.

In particular, it follows from the shift pattern according to FIG. 12 that in the first gear plane 8-12 designed as a dual gear plane, the idler gear 8 will be used for three forward gears G4, C1, O3 as well as for one reverse gear R3 and the idler gear 12 will be used for seven forward gears O1, G6, C4, O1 thru O4. In the second gear plane 9-13 designed as a dual gear plane, the idler gear 9 will be used for seven forward gears O1, G2, G8, C2, C3, C4, O4 as well as for two reverse gears R2, R4 and the idler gear 13 will be used for four reverse gears R1 thru R4. In the third gear plane 10-14 designed as a dual gear plane, the idler gear 10 will be used for one forward gear G8 as well as for two reverse gears R1, R3 and the idler gear 14 will be used for five forward gears G3, C1, C2, C4, O1 as well as for two reverse gears R2, R4. In the fourth gear plane 11-4 designed as a single gear plane, the idler gear 11 will be used for nine forward gears G7, G8, C1 thru C3, O1 thru O4. In the fifth gear plane 5-15 designed as a single gear plane, the idler gear 15 will be used for four forward gears G1, G5, C3, O2 as well as for one reverse gear R1.

In the seventh variant embodiment according to FIGS. 13 and 14, a winding path gear coupling device S_ab2 and two winding path gear-shift elements I and K allocated to the output gear 18 are provided. A first forward gear as a winding path gear can be realized via the gear stages of the third, fourth and second gears and an eighth forward gear as a winding path gear can be realized via the gear stage of the second gear, via the additional gear stage ZW_8 and via the gear stage of the seventh gear. Moreover, three dual gear planes and two single gear planes are arranged. In addition, an additional crawler gear C2 power shiftable to the second Gang for better driving features off road is obtained. In addition thereto, an additional overdrive gear O1 power shiftable to the seventh forward gear can be realized for fuel savings.

In particular, it follows from the shift pattern of the seventh variant embodiment that in the first gear plane 8-12 designed as a dual gear plane, the idler gear 8 will be used for two reverse gears R1, R2 and the idler gear 12 will be used for four forward gears G6, C2, O2, O3. In the second gear plane 9-2 designed as a single gear plane, the idler gear 9 will be used for six forward gears G1, G2, G8, C1, C2, O3. In the third gear plane 3-13 designed as a single gear plane, the idler gear 13 will be used for three forward gears O1, G4, O1 as well as for one reverse gear R1. In the fourth gear plane 10-14 designed as a dual gear plane, the idler gear 10 will be used for one forward gear G8 as well as for one reverse gear R1 and the idler gear 14 will be used for six forward gears G1, G3, C1, C2, O1, O2 as well as for one reverse gear R2. Finally, in the fifth gear plane 11-15 designed as a dual gear plane, the idler gear 11 will be used for three forward gears G5, C1, O2 and the idler gear 15 for three forward gears G7, O8, O1.

It is feasible, that for one or even more variant embodiments, at least one additional gear stage ZW_x, such as ZW_8 or ZW_1 will be used for winding path gears that are not being used in a direct forward gear. The use of an additional gear stage results from the respective Figs. of the variant embodiments.

Also gear wheels x1, x2, . . . x7, x8 can be used for additional winding path gears, that can be added additionally to a single gear plane, while the numbering of the gear wheels x1, x2, . . . x7, x8 will be done as follows. The numbering starts with the first gear wheel x1 of the first countershaft w_v1 starting from the allocated output stage i_ab_1 continuously up to the fourth gear wheel x4, while the first gear wheel on the second countershaft w_v2 starting from the allocated output stage i_ab_2 will be designated with x5 and the other gear wheels continuously up to x8. When the additional gear wheel x1, x2, . . . x7, x8 will be used within the scope of a reverse gear ratio, a reversal of rotation will occur, such as via the use of an intermediate gear ZR on an intermediate shaft w_zw or the like.

For all variant embodiments of the double clutch transmissions, as a result of this provided multi usage of individual idler gears, fewer gear planes are required and thus fewer components for the same number of gears, so that this results in an advantageous construction space and cost savings.

independent of the respective variant embodiment, the number "1" in a field of the respective table of the shift pattern according to FIGS. 2, 4, 6, 8, 10 12 and 14, indicates that the allocated clutch K1, K2 or the allocated coupling device A, B, C, D, E, F, G, H or the allocated shift element I, K respectively is engaged or activated. Whereas a free field in the respective table of the shift patterns according to the FIGS. 2, 4, 6, 8, 10, 12 and 14, indicates that respectively the allocated clutch K1, K2 or the allocated coupling device A, B, C, D, E, F, G, H or the allocated shift element I, K is disengaged.

Other than the above mentioned rule, it means for the coupling device S_ab1 or S_ab2 allocated to output gear 17 or 8 that with a blank field in the respective table of the shift patterns according to the FIGS. 2, 4, 6, 8 ,10,12 and 14, the coupling device S_ab1 or S_ab2 must be disengaged, and that for a field with the number "1" in the respective table of the shift patterns according to the FIGS. 2, 4, 6, 8, 10,12 and 14, the coupling device S_ab1 or S_ab2 should be engaged. Depending of the gear, the coupling device S_ab1 or S_ab2 must even be engaged for a group of gears of fields with the number "1", whereas the coupling element S_ab1 or S_ab2 can be disengaged as well as engaged for another group of gears with a field with the number "1".

Moreover, in many instances there is the possibility to insert additional coupling or shift elements without having an effect on the power flow. Thus, an advanced gear selection can be made possible.

REFERENCE MARKS 1 fixed gear of the second transmission input shaft
2 fixed gear of the second transmission input shaft
3 fixed gear of the second transmission input shaft
4 fixed gear of the first transmission input shaft
5 fixed gear of the first transmission input shaft
6 fixed gear of the first transmission input shaft
8 idler gear of the first countershaft
9 idler gear of the first countershaft
10 idler gear of the first countershaft
11 idler gear of the first countershaft
12 idler gear of the second countershaft
13 idler gear of the second countershaft 14 idler gear of the second countershaft
15 idler gear of the second countershaft
16 fixed gear of the output shaft
17 output gear of the first countershaft
18 output gear of the second countershaft
19 torsion vibration damper
K1 first clutch
K2 second clutch
w_an input shaft
w_ab output shaft
w_v1 first countershaft
w_v2 second countershaft
w_k1 first transmission input shaft
w_k2 second transmission input shaft
A coupling device
B coupling device
C coupling device
D coupling device
E coupling device
F coupling device
G coupling device
H coupling device
i_1 gear stage first forward gear
i_2 gear stage second forward gear
i_3 gear stage third forward gear
i_4 gear stage fourth forward gear
i_5 gear stage fifth forward gear
i_6 gear stage sixth forward gear
i_7 gear stage seventh forward gear
i_8 gear stage eighth forward gear
i_R gear stage reverse gear
ZW_8 additional gear stage for winding path gears
i_ab_1 output step on the first countershaft
i_ab_2 output step on the second countershaft
G1 first forward gear
G2 second forward gear
G3 third forward gear
G4 fourth forward gear
G5 fifth forward gear
G6 sixth forward gear
G7 seventh forward gear
G8 eighth forward gear
C1 crawler gear (crawler)
C2 crawler gear (crawler)
C3 crawler gear (crawler)
C4 crawler gear (crawler)
O1 overdrive gear (overdrive)
O2 overdrive gear (overdrive)
O3 overdrive gear (overdrive)
O4 overdrive gear (overdrive)
O5 overdrive gear (overdrive)
O6 overdrive gear (overdrive)
O7 overdrive gear (overdrive)
O8 overdrive gear (overdrive)
R1 Reverse gear
R2 reverse gear
R3 reverse gear
R4 reverse gear
R5 reverse gear
R6 reverse gear
R7 reverse gear
w_zw intermediate shaft
ZR intermediate gear for reversal of rotation
ZS used gear stage
I shift element optional
K shift element optional
S_ab1 coupling device on output step
S_ab2 coupling device on output step
lsb. lastschaltbar=power shiftable

The invention claimed is:

1. A double clutch transmission comprising:
first and second clutches (K1, K2) each comprising an input side connected to a drive shaft (w_an) and an output side connected to a respective one of a first and a second transmission input shaft (w_k1, w_k2) coaxially arranged with respect to one another;
at least first and second countershafts (w_v1, w_v2) supporting toothed idler gearwheels (8, 9, 10, 11, 12, 13, 14, 15);
toothed fixed gearwheels (1, 2, 3, 4, 5, 6) being supported on the first and the second transmission input shafts (w_k1, w_k2) in a rotationally fixed manner, and the fixed gearwheels (1, 2, 3, 4, 5, 6) engaging with at least one of the idler gearwheels (8, 9, 10, 11, 12, 13, 14, 15);
a plurality of coupling devices (A, B, C, D, E, F, G, H) for connecting an idler gearwheel (8, 9, 10, 11, 12, 13, 14, 15) to one of the first and the second countershafts (w_v1, w_v2) in a rotationally fixed manner;
a first output gear (17) being provided on the first countershaft (w_v1) and a second output gear (18) being provided on the second countershaft (w_v2), at least one of the first output gear (17) and the second output gear (18) having at least one coupling device (S_ab1, S_ab2), and each of the first and the second output gears (17, 18) being coupled to gearing of an output shaft (w_ab) so that at least several power shiftable forward gears (1, 2, 3, 4, 5, 6, 7, 8) and at least one reverse gear (R1, R2, R3, R4, R5, R6, R7) being shiftable;
wherein a maximum of six gear planes (8-12, 9-2, 3-13, 9-13, 10-4, 5-14, 10-14, 11-4, 11-5, 5-15, 6-15, 11-15) are provided, at least two of the maximum of six gear planes are dual gear planes (8-12, 9-13, 10-14, 11-15) and in each of the at least two dual gear planes (8-12, 9-13, 10-14, 11-15) has allocated thereto an idler gearwheel (8, 9, 10, 11, 12, 13, 14, 15) of each of the first and second countershafts (w_v1, w_v2) and a fixed gearwheel (1, 2, 3, 4, 5, 6) of one of the first and the second transmission input shafts (w_k1, w_k2), and for each of the dual gear planes (8-12, 9-13, 10-14, 11-15) at least one idler gearwheel (8, 9, 10, 11, 12, 13, 14, 15) can be used for at least two gears, and
at least two of the maximum of six gear planes are single gear planes (9-2, 3-13, 10-4, 5-14, 11-4, 11-5, 5-15, 6-15) whereby an idler gearwheel (8, 10, 11, 12, 13, 14, 15) of one of the first and the second countershafts (w_v1, w_v2) is allocated to one fixed gearwheel (1, 2, 3, 4, 5, 6) of one of the first and the second transmission input shafts (w_K1, w_K2) so that at least one power shiftable winding path gear can be shifted via disengagement of the at least one coupling device (S_ab1, S_ab2) allocated to the first and the second output gears (17, 18),
wherein the fixed gearwheels (1, 2) of the second transmission input shaft (w_k2) of a second subtransmission are allocated to a first gear plane (8-12), which is a dual gear plane, and to a second gear plane (9-13), which is a dual gear plane, and the fixed gearwheels (3, 4, 5) of the first transmission input shaft (w_k1) of a first subtransmission are allocated a third gear plane (10-14), which is a dual gear plane, to a fourth gear plane (11-4), which is a single gear plane, and to a fifth gear plane (5-15), which is a single gear plane.

2. A double clutch transmission comprising:
first and second clutches (K1, K2) each comprising an input side connected to a drive shaft (w_an) and an output side connected to a respective one of a first and a second transmission input shaft (w_k1, w_k2) coaxially arranged with respect to one another;

at least first and second countershafts (w_v1, w_v2) supporting toothed idler gearwheels (8, 9, 10, 11, 12, 13, 14, 15);

a plurality of toothed fixed gearwheels (1, 2, 3, 4, 5, 6) being supported on each of the first and the second transmission input shafts (w_k1, w_k2) in a rotationally fixed manner, and the fixed gearwheels (1, 2, 3, 4, 5, 6) engaging with at least one of the idler gearwheels (8, 9, 10, 11, 12, 13, 14, 15);

a plurality of coupling devices (A, B, C, D, E, F, G, H) for connecting an idler gearwheel (8, 9, 10, 11, 12, 13, 14, 15) to one of the first and the second countershafts (w_v1, w_v2) in a rotationally fixed manner;

a first output gear (17) being provided on the first countershaft (w_v1) and a second output gear (18) being provided on the second countershaft (w_v2), at least one of the first output gear (17) and the second output gear (18) having at least one coupling device (S_ab1, S_ab2), and each of the first and the second output gears (17, 18) being coupled to gearing of an output shaft (w_ab) so that at least several power shiftable forward gears (1, 2, 3, 4, 5, 6, 7, 8) and at least one reverse gear (R1, R2, R3, R4, R5, R6, R7) being shiftable, and the first output gear (17), the second output gear (18) and the gearing of an output shaft (w_ab) together form an output dual gear plane (16, 17, 18) of the double clutch transmission, and the gearing of the output shaft (w_ab) being located between the first countershaft (w_v1) and the second countershaft (w_v2);

wherein a maximum of six gear planes (8-12, 9-2, 3-13, 9-13, 10-4, 5-14, 10-14, 11-4, 11-5, 5-15, 6-15, 11-15) are provided, at least two of the maximum of six gear planes are dual gear planes (8-12, 9-13, 10-14, 11-15) and in each of the at least two dual gear planes (8-12, 9-13, 10-14, 11-15) has allocated thereto an idler gearwheel (8, 9, 10, 11, 12, 13, 14, 15) of each of the first and second countershafts (w_v1, w_v2) and a fixed gearwheel (1, 2, 3, 4, 5, 6) of one of the first and the second transmission input shafts (w_k1, w_k2), and for each of the dual gear planes (8-12, 9-13, 10-14, 11-15) at least one idler gearwheel (8, 9, 10, 11, 12, 13, 14, 15) can be used for forming at least two gears, and at least two of the maximum of six gear planes are single gear planes (9-2, 3-13, 10-4, 5-14, 11-4, 11-5, 5-15, 6-15) whereby an idler gearwheel (8, 10, 11, 12, 13, 14, 15) of one of the first and the second countershafts (w_v1, w_v2) is allocated to one fixed gearwheel (1, 2, 3, 4, 5, 6) of one of the first and the second transmission input shafts (w_K1, w_K2) so that at least one power shiftable winding path gear can be shifted via disengagement of the at least one coupling device (S_ab1, S_ab2) allocated to the first and the second output gears (17, 18); and the first and the second clutches (K1, K2) are axially located between the output dual gear plane (16, 17, 18) of the double clutch transmission and the maximum of six gear planes (8-12, 9-2, 3-13, 9-13, 10-4, 5-14, 10-14, 11-4, 11-5, 5-15, 6-15, 11-15).

3. The double clutch transmission according to claim 2, wherein the at least one coupling device (S_ab1) is located on the first countershaft (w_v1) and, upon disengagement of the coupling device (S_ab1) located on the first countershaft (w_v1), the first forward gear (G1), at least one reverse gear (R1, R2, R3, R4), at least one crawler gear (C3, C4) and at least one overdrive gear (O1, O3, O6, O7, O8) can be respectively shifted as winding path gears.

4. The double clutch transmission according to claim 2, wherein the at least one coupling device (S_ab2) is located on the second countershaft (w_v2) and, upon disengagement of the coupling device (S_ab2) on the second countershaft (w_v2), at least one of a first forward gear (G1), an eighth forward gear (G8), a reverse gear (R4, R5, R6, R7), a crawler gear (C2, C3, C4), and an overdrive gear (O1, O2, O3) can be shifted as a winding path gear.

5. The double clutch transmission according to claim 2, wherein a shift element (I) is provided on the first countershaft (w_v1), upon activation of the shift element (I) provided on the first countershaft (w_v1), an idler gearwheel (9) of a second subtransmission is connected with an idler gearwheel (10) of a first subtransmission so that, via activation of the shift element (I) provided on the first countershaft (w_v1), at least one of a first forward gear (G1) and an eighth forward gear (G8) is shifted as a winding path gear.

6. The double clutch transmission according to claim 2, wherein a shift element (K) is provided on the second countershaft (w_v2), upon activation of the shift element (K) provided on the second countershaft (w_v2), an idler gearwheel (13) of a second subtransmission is connected with an idler gearwheel (14) of a first subtransmission so that, via activation of the shift element (K) provided on the second countershaft (w_v2), at least one of a first forward gear (G1), an eighth forward gear (G8), a reverse gear (R2) and an overdrive gear (O1) is shiftable as a winding path gear.

7. The double clutch transmission according to claim 2, wherein the fixed gearwheels (1, 2, 3) of the second transmission input shaft (w_k2) of a second subtransmission are allocated to a first gear plane (8-12), which is a dual gear plane, to a second gear plane (9-2), which is a single gear plane, and to a third gear plane (3-13), which is a single gear plane, and the fixed gearwheels (4, 5, 6) of the first transmission input shaft (w_k1) of a first subtransmission are allocated to a fourth gear plane (10-14), which is a dual gear plane, to a fifth gear plane (11-5), which is a single gear plane, and to a sixth gear plane (6-15), which is a single gear plane.

8. The double clutch transmission according to claim 2, wherein the fixed gears (1, 2, 3) of the second transmission input shaft (w_k2) of a second subtransmission are allocated to a first gear plane (8-12), which is a dual gear plane, to a second gear plane (9-2), which is a single gear plane, and to a third gear plane (3-13), which is a single gear plane, and the fixed gears (4, 5, 6) of the first transmission input shaft (w_k1) of a first subtransmission are allocated to a fourth gear plane (10-4), which is a single gear plan, to a fifth gear plane (5-14), which is a single plane, and a to sixth gear plane (11-15), which is a dual gear plane.

9. The double clutch transmission according to claim 2, wherein the fixed gears (1, 2, 3) of the second transmission input shaft (w_k2) of a second subtransmission are allocated to a first gear plane (8-12), which is a dual gear plane, to a second gear plane (9-2), which is a single gear plane, and to a third gear plane (3-13), which is a single gear plane, and the fixed gears (4, 5) of the first transmission input shaft (w_k1) of a first subtransmission are allocated to a fourth gear plane (10-14), which is a dual gear plane and to a fifth gear plane (11-15), which is a dual gear plane.

* * * * *